(12) United States Patent
Keener, Jr. et al.

(10) Patent No.: US 8,606,649 B2
(45) Date of Patent: Dec. 10, 2013

(54) DISPLAY OF ANOMYMOUS PURCHASE INFORMATION OVER THE INTERNET

(76) Inventors: Ellis Barlow Keener, Jr., Brookline, MA (US); Vishal Kumar, Nashua, NH (US)

(*) Notice: Subject to any disclaimer, the term of this patent is extended or adjusted under 35 U.S.C. 154(b) by 761 days.

(21) Appl. No.: 12/610,975

(22) Filed: Nov. 2, 2009

(65) Prior Publication Data

US 2010/0121775 A1      May 13, 2010

Related U.S. Application Data

(60) Provisional application No. 61/110,531, filed on Oct. 31, 2008.

(51) Int. Cl.
*G06Q 30/00* (2012.01)
(52) U.S. Cl.
USPC ............... 705/26.64; 705/26.1; 705/27.1
(58) Field of Classification Search
USPC .................................................. 705/26, 27
See application file for complete search history.

(56) References Cited

U.S. PATENT DOCUMENTS

| | | | |
|---|---|---|---|
| 2002/0059196 A1* | 5/2002 | I'Anson et al. | 707/3 |
| 2003/0088466 A1* | 5/2003 | Fitzpatrick | 705/14 |
| 2005/0159974 A1* | 7/2005 | Moss et al. | 705/1 |
| 2008/0301006 A1* | 12/2008 | Holly et al. | 705/27 |

OTHER PUBLICATIONS

Kumar et al.: "The Impact of Internal and External Reference Prices on Brand Choice: The Moderating Role of Contextual Variables," Journal of Retailing, Fall 1998, v74n3pps401-426, Dialog file 15 #01746428, 94pgs.*

* cited by examiner

*Primary Examiner* — Rob Pond

(57) ABSTRACT

The invention is characterized as a data processing architecture and method for multi-stage processing of buyers' purchase information documents where information of actual purchases are delivered to a server on the Internet and users of the system are able to view aggregated information of actual purchases, purchase dates, and store locations of anonymous buyers.

23 Claims, 24 Drawing Sheets

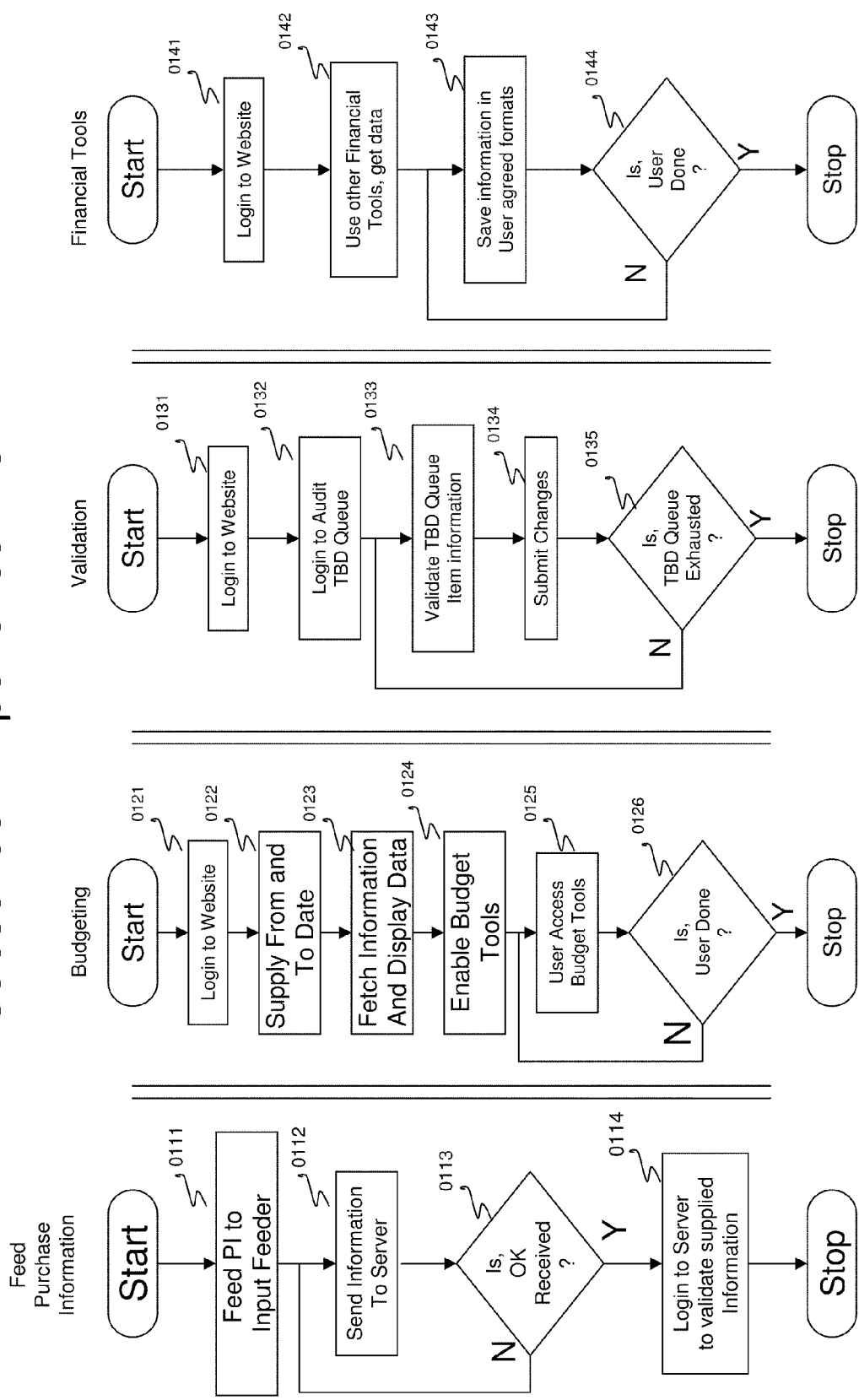

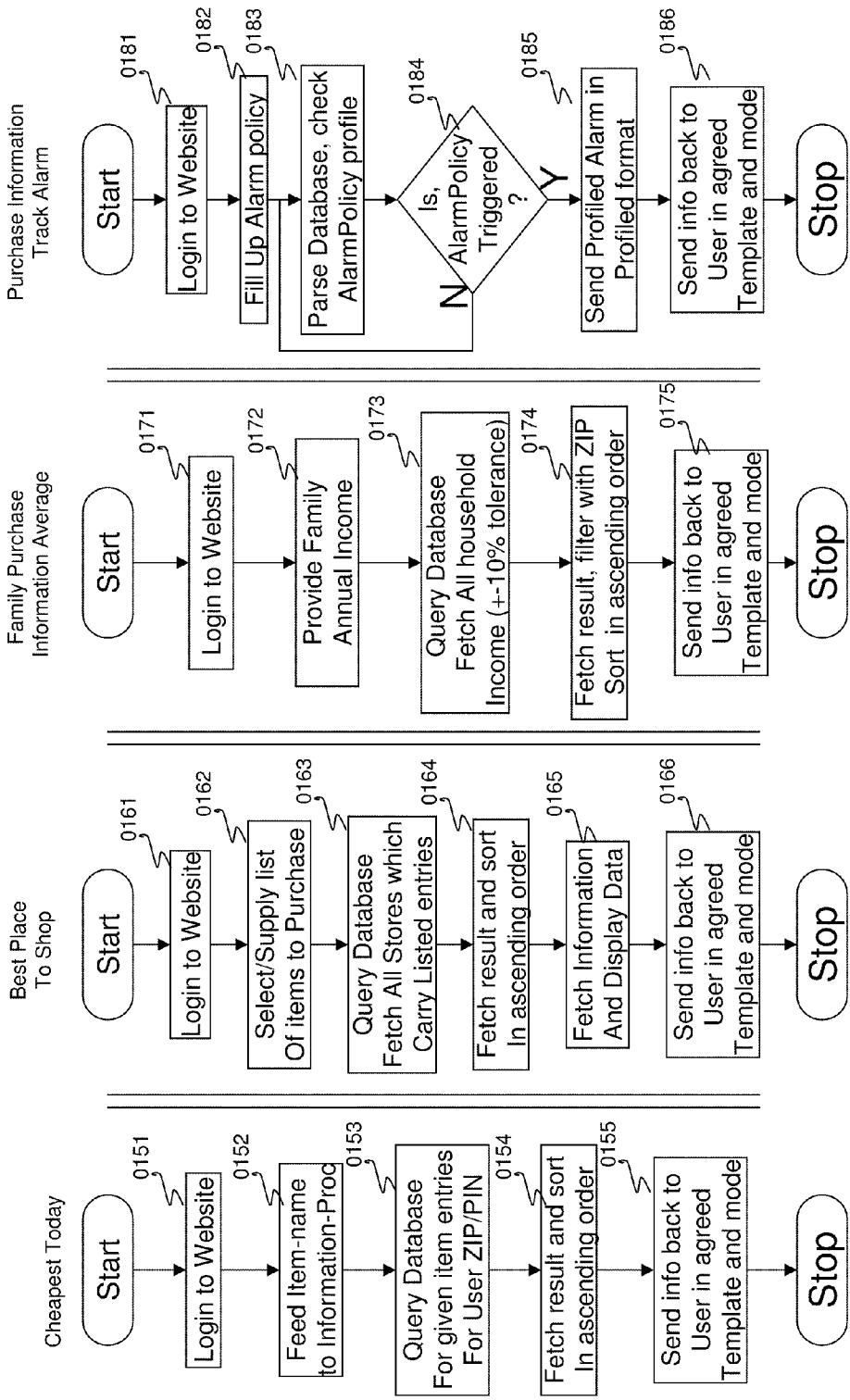

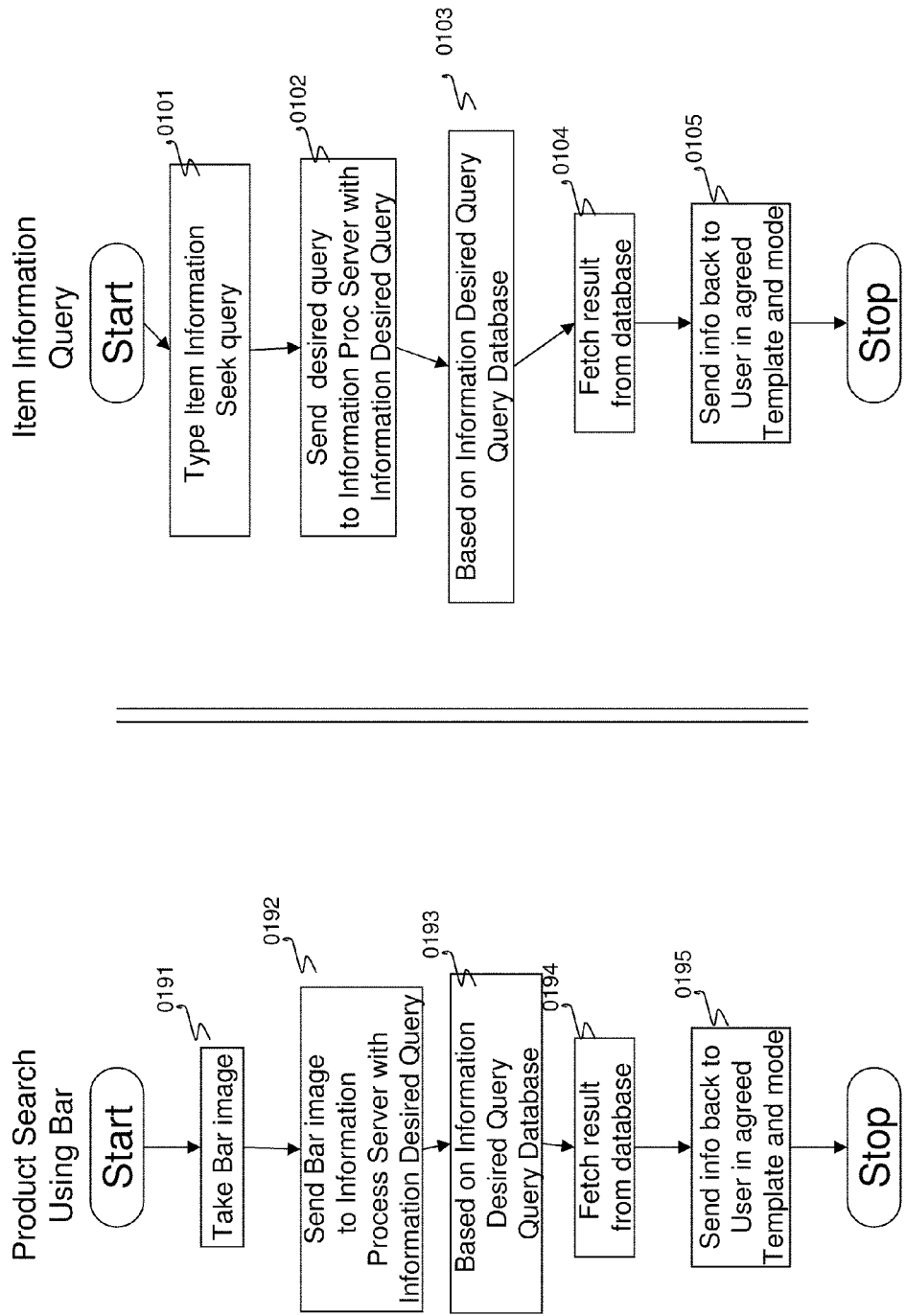
Subscriber Experience FIG. 3

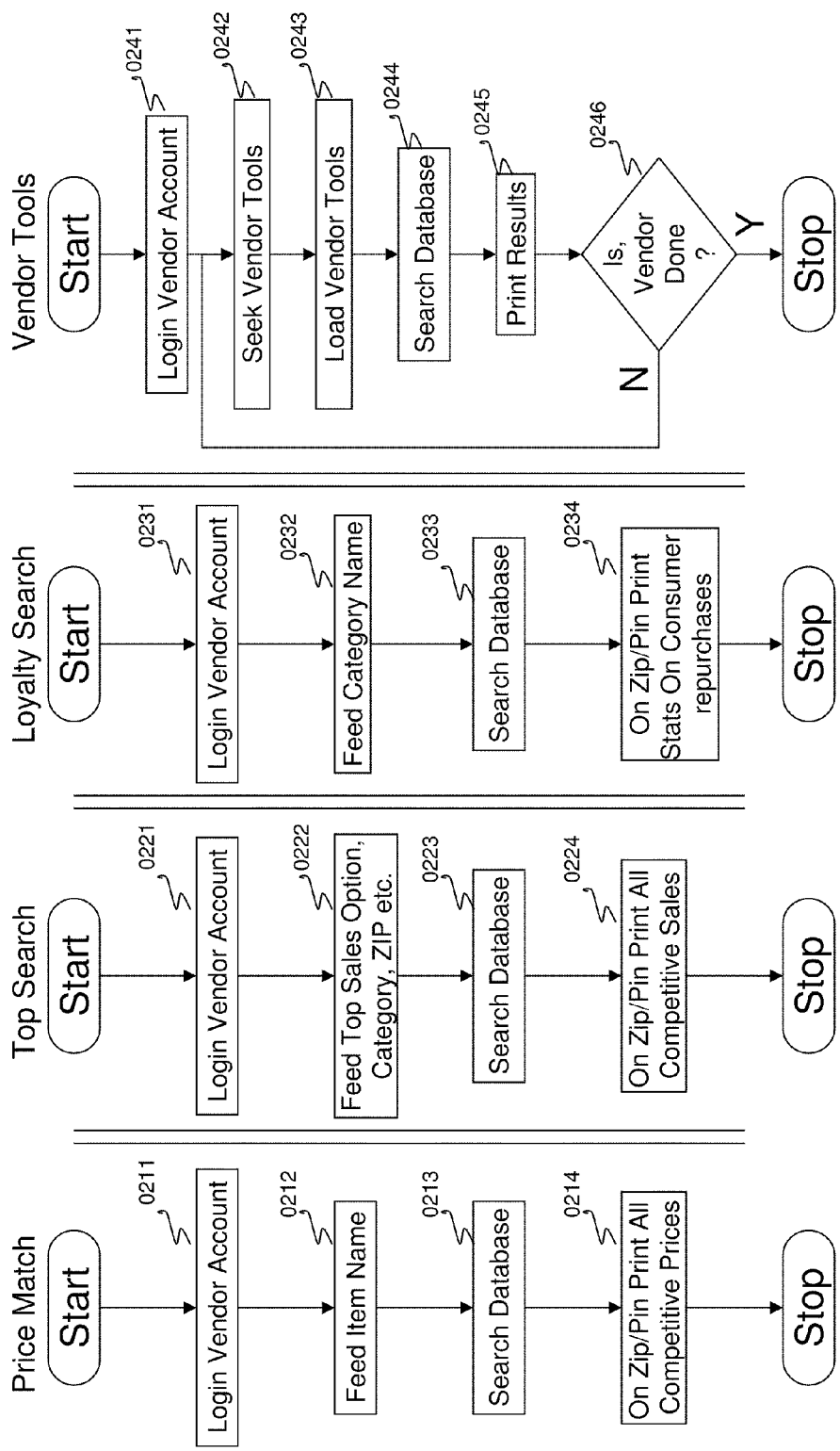
Vendor Experience FIG. 4

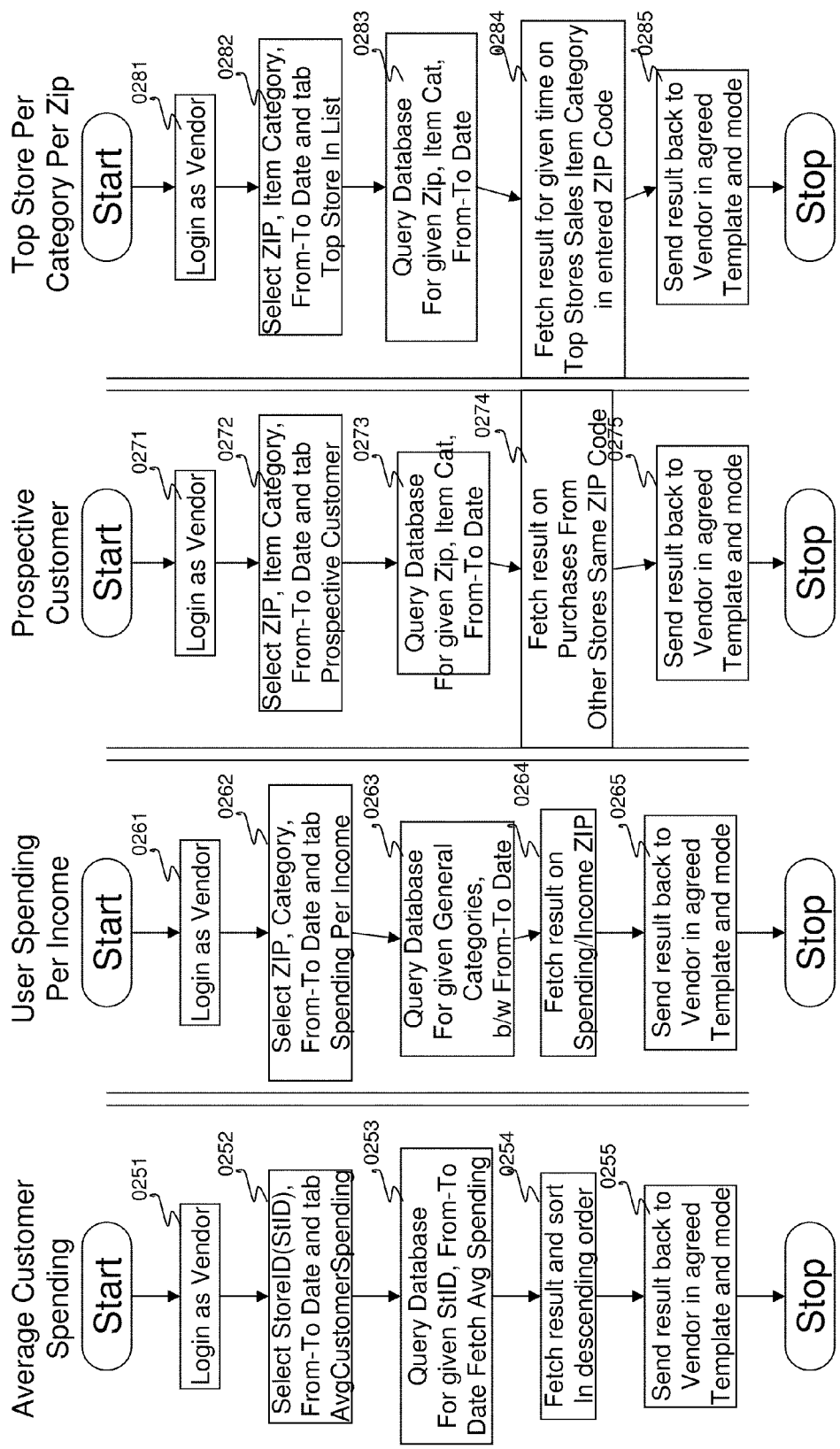
Vendor Experience FIG. 5

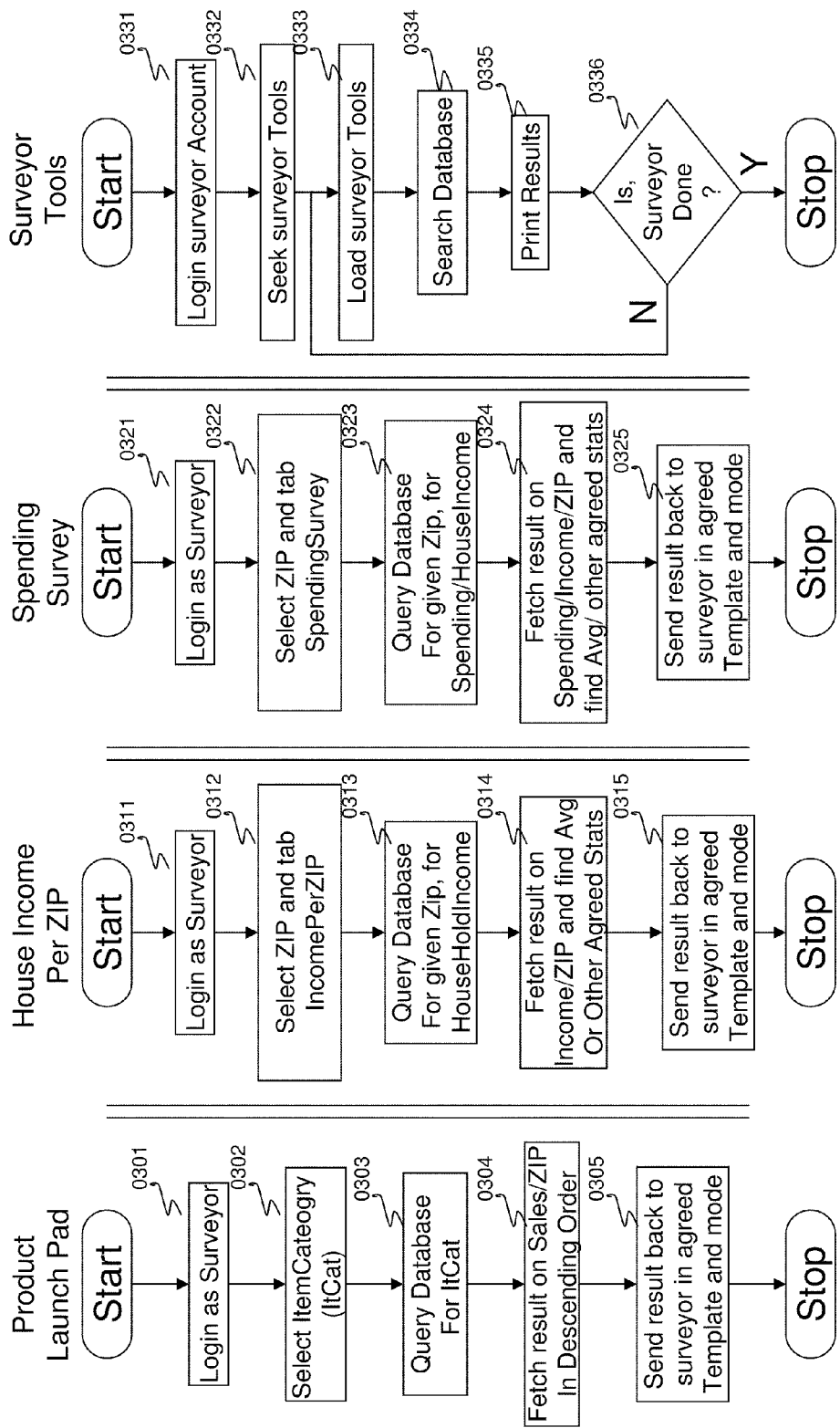
Survey Experience FIG. 6

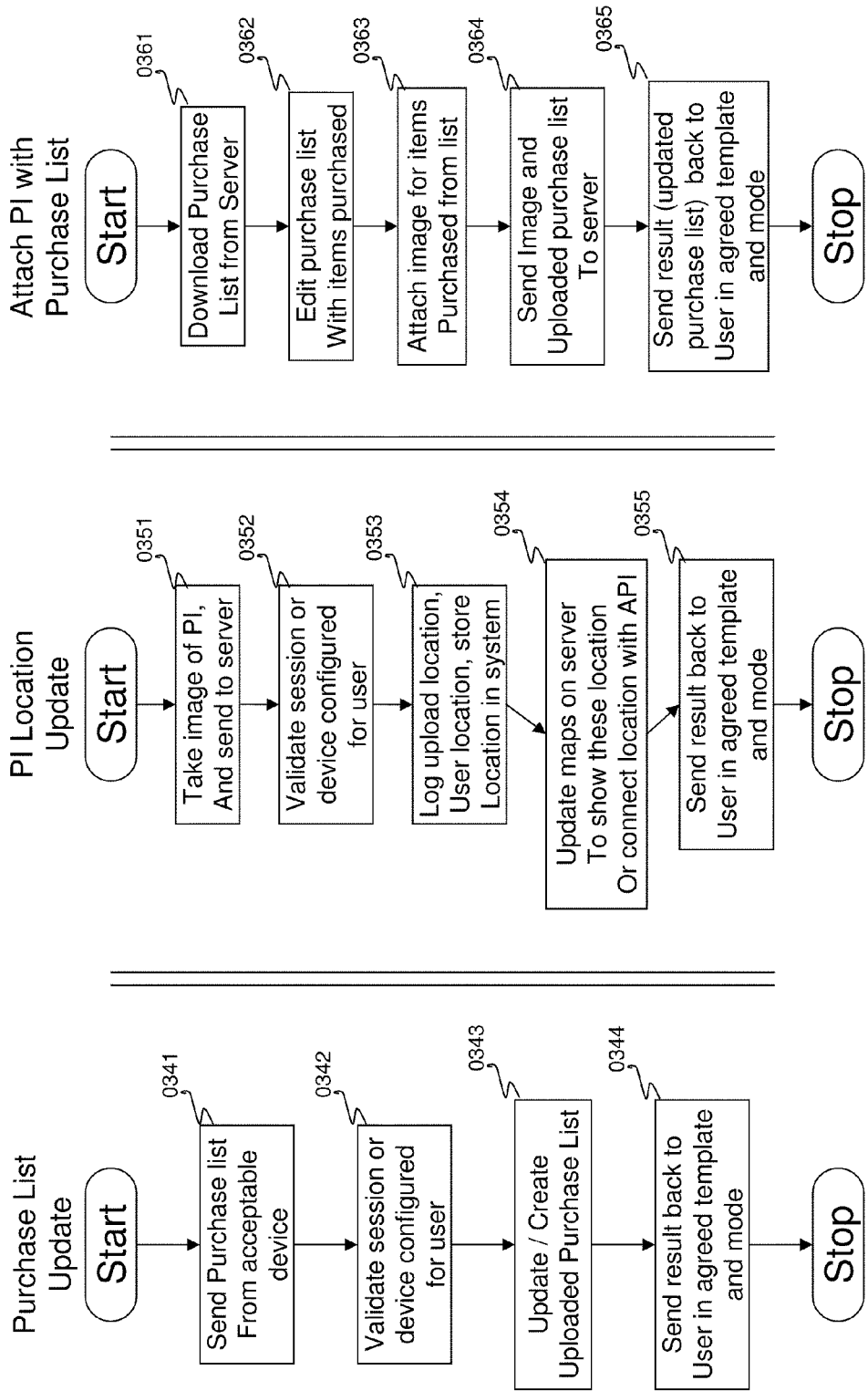
User Extended Experience FIG. 7

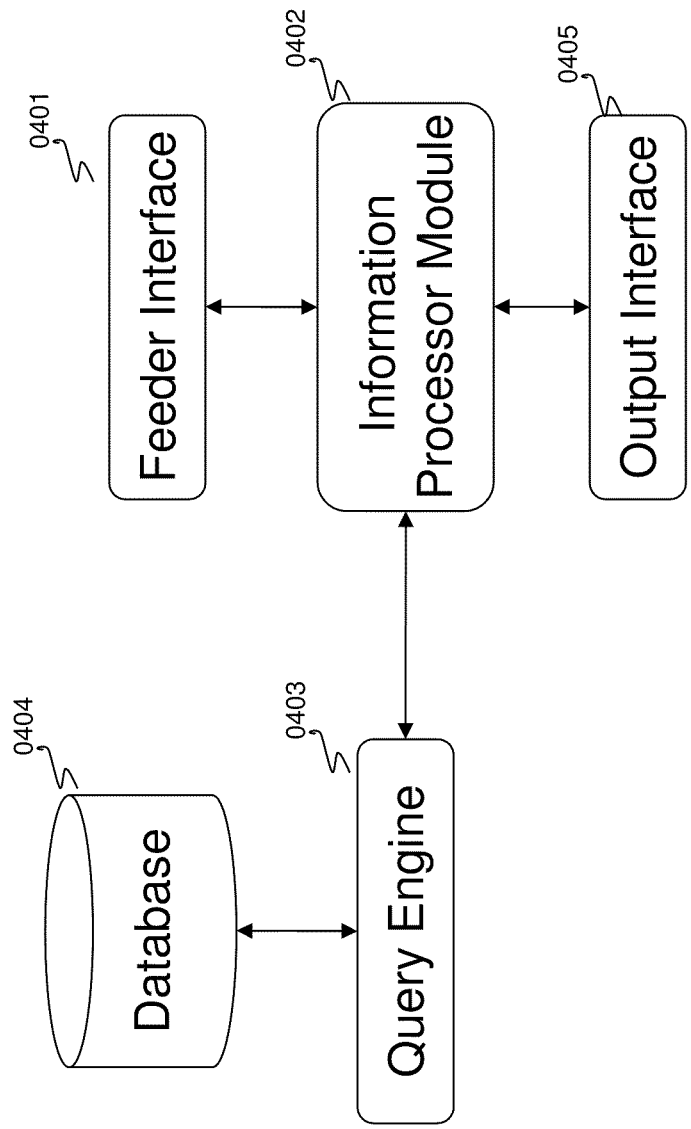
PI and Budget Management System FIG. 8

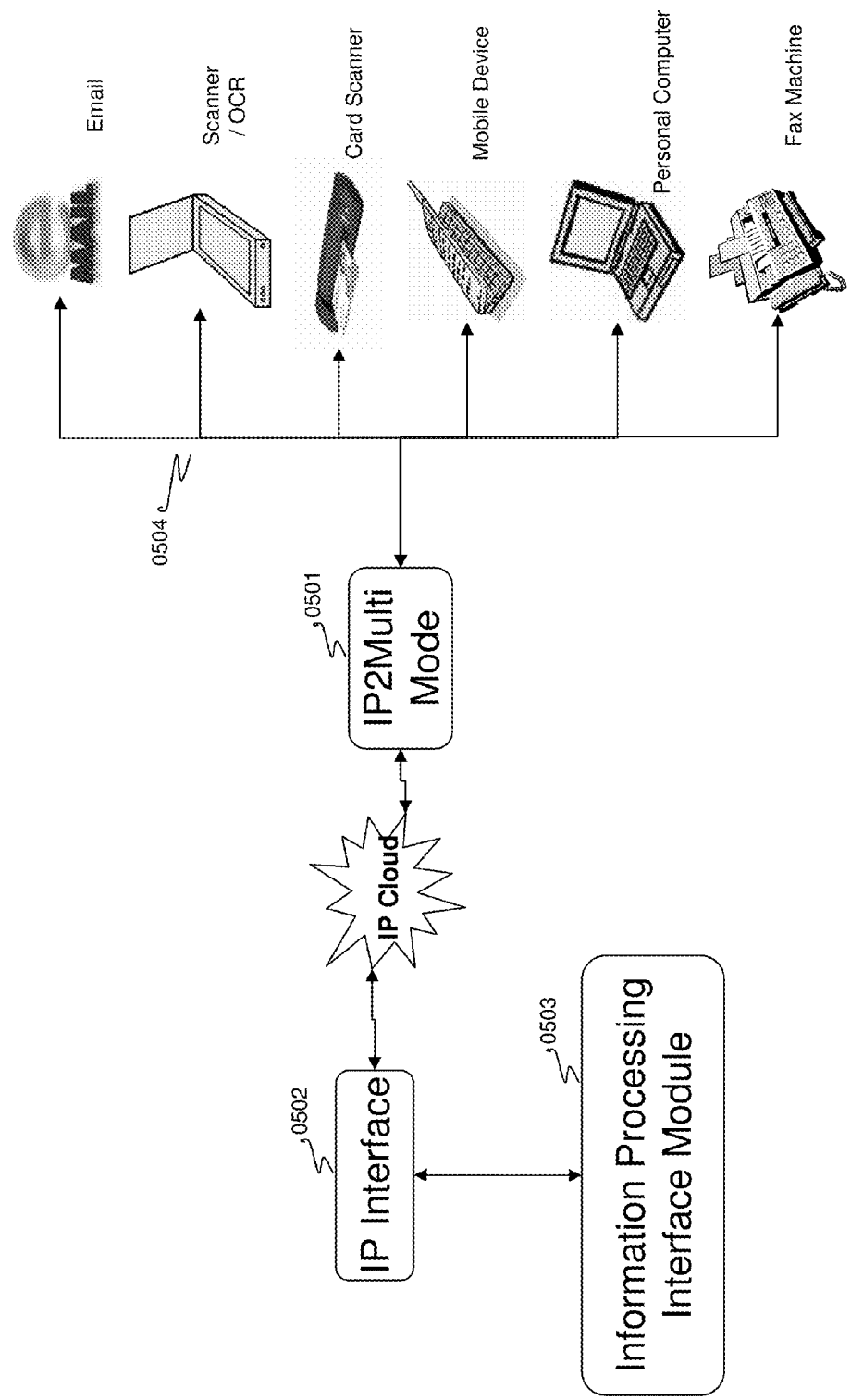
Input/Feeder and PI Scanning Interface FIG. 9

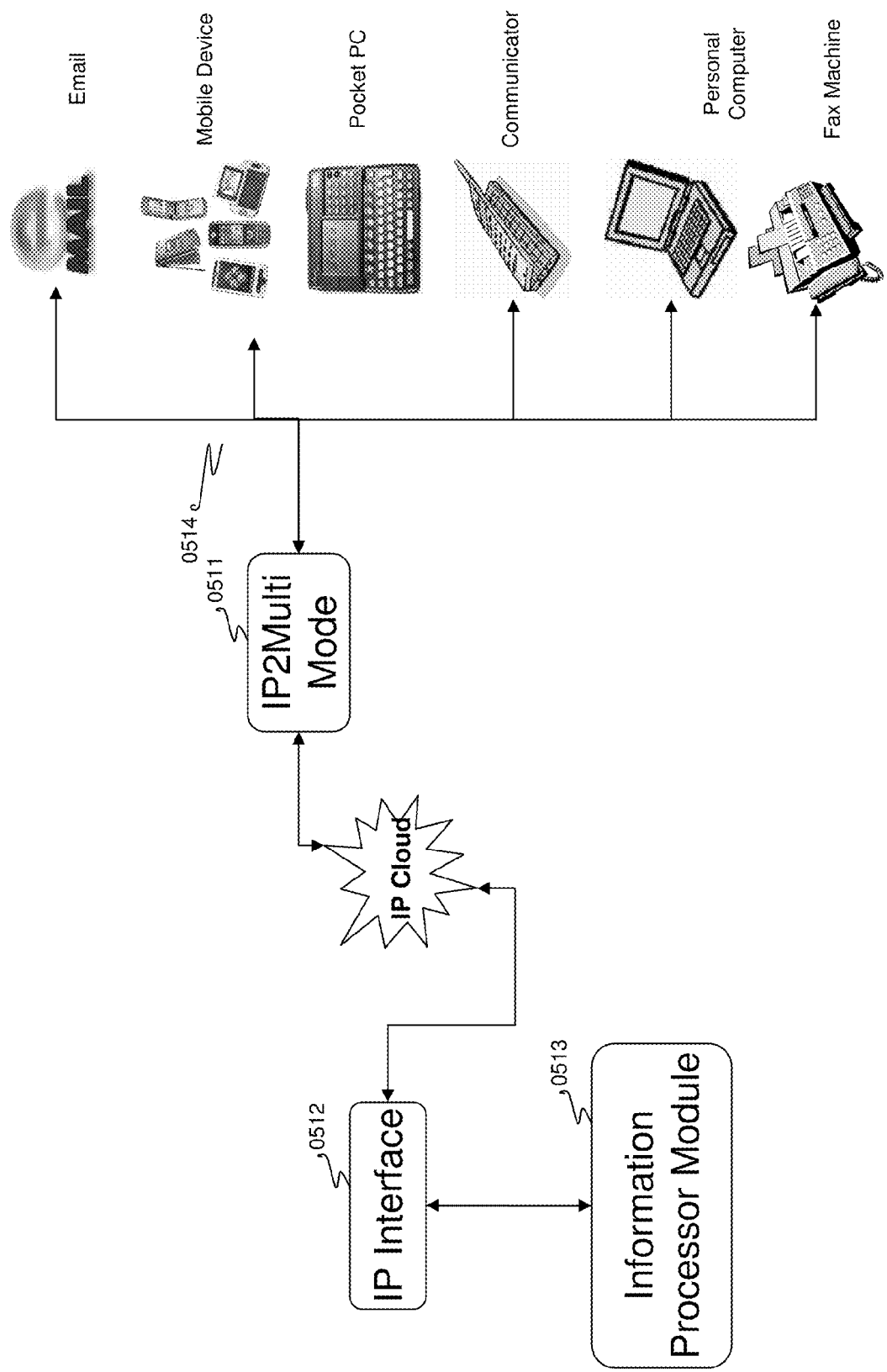

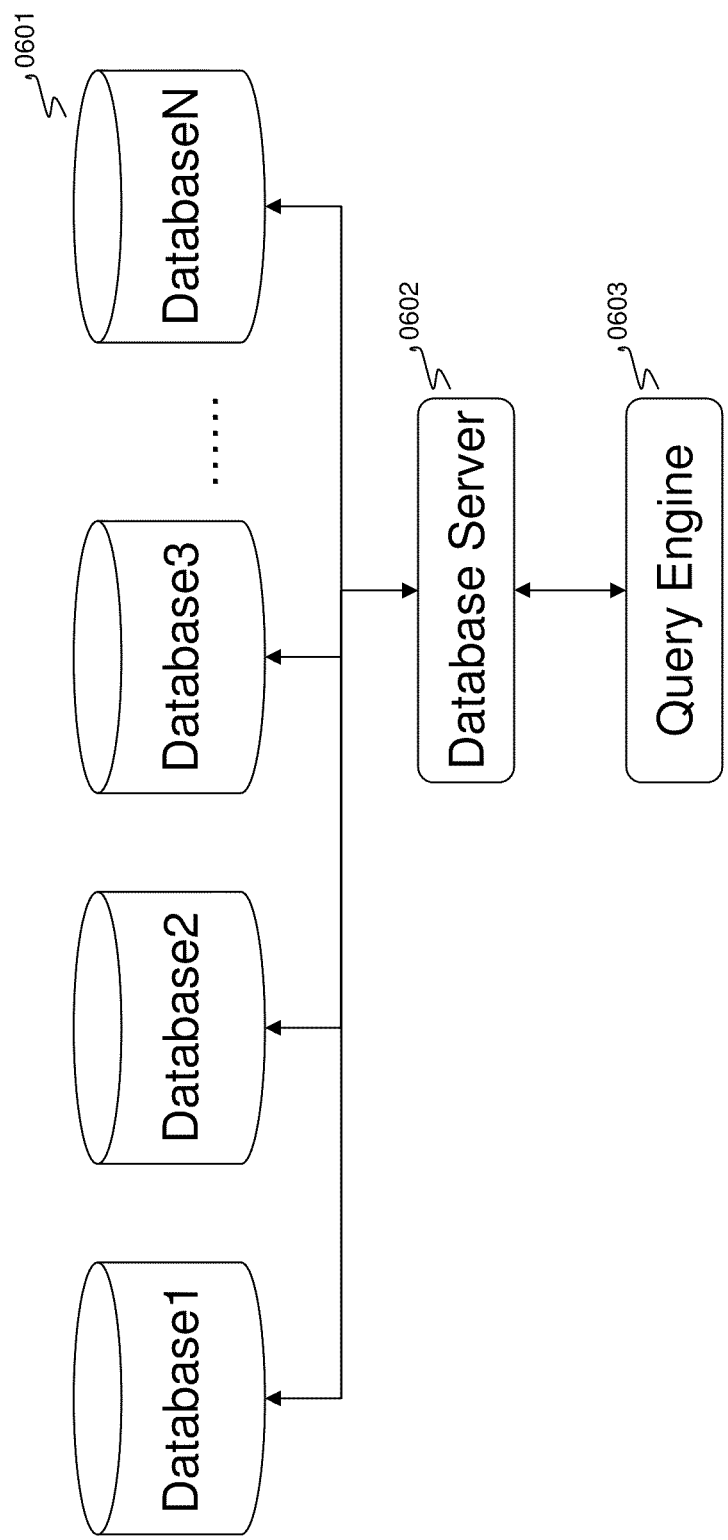
Query Engine and Database FIG. 11

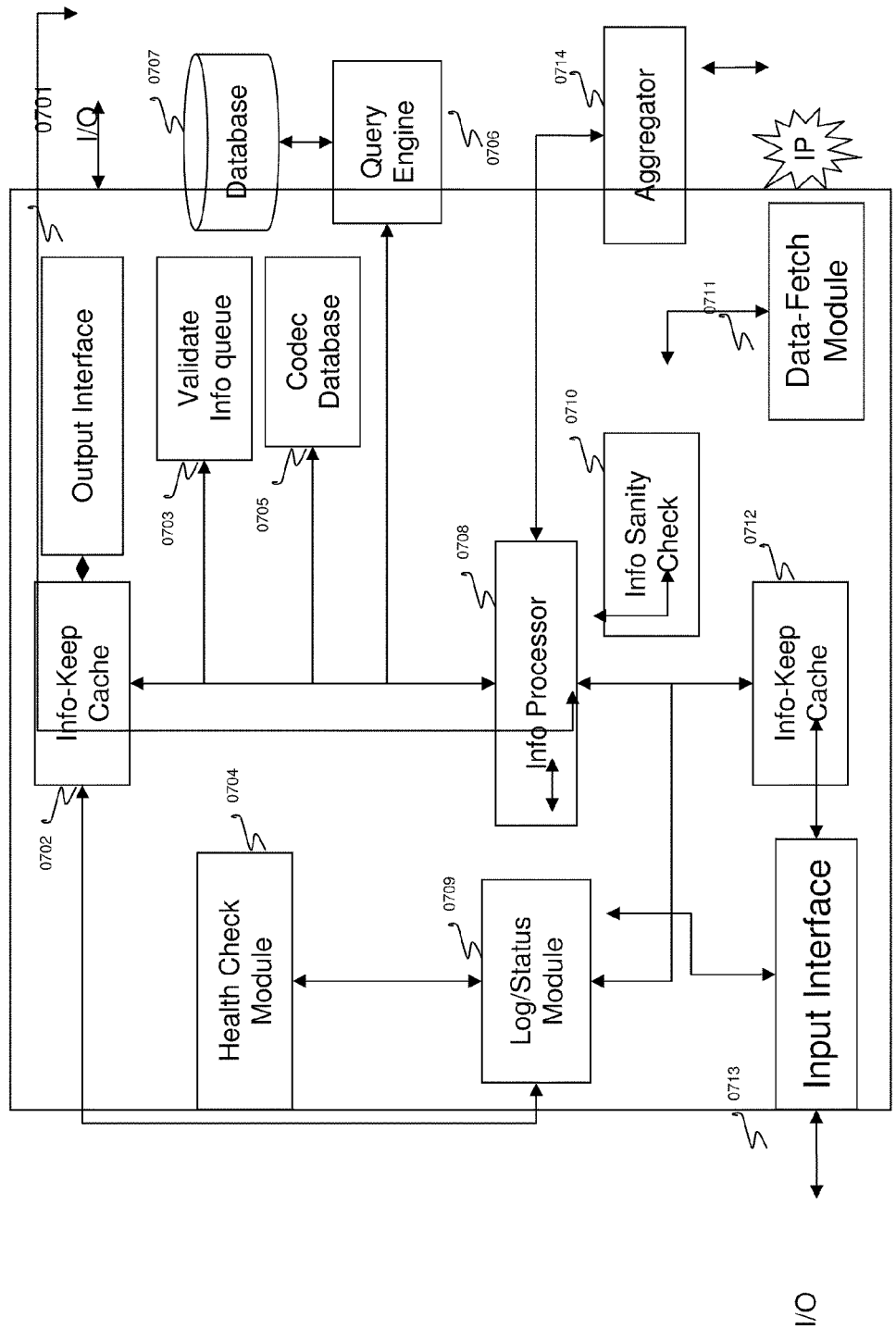
Information Processor Module FIG. 12

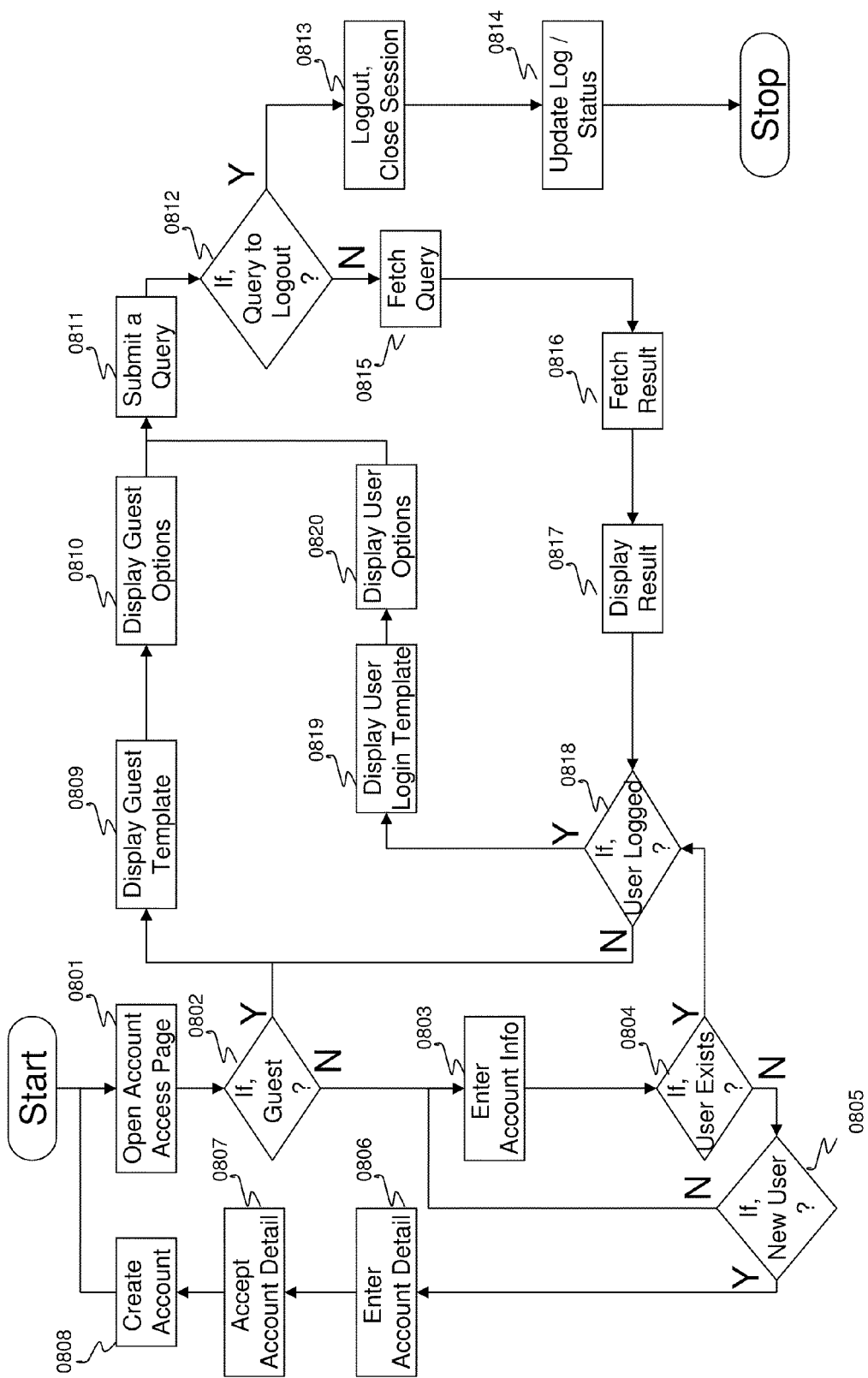

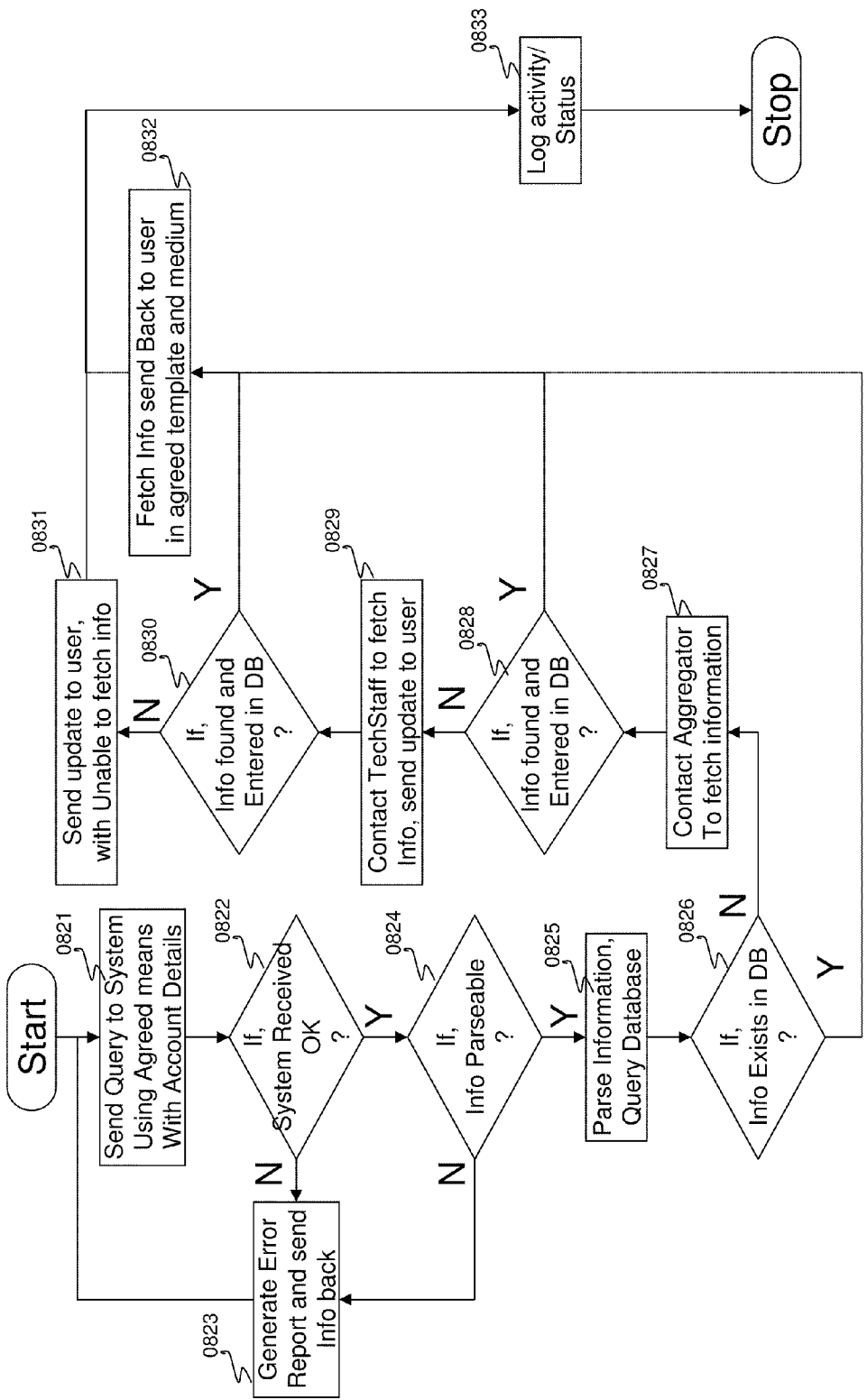

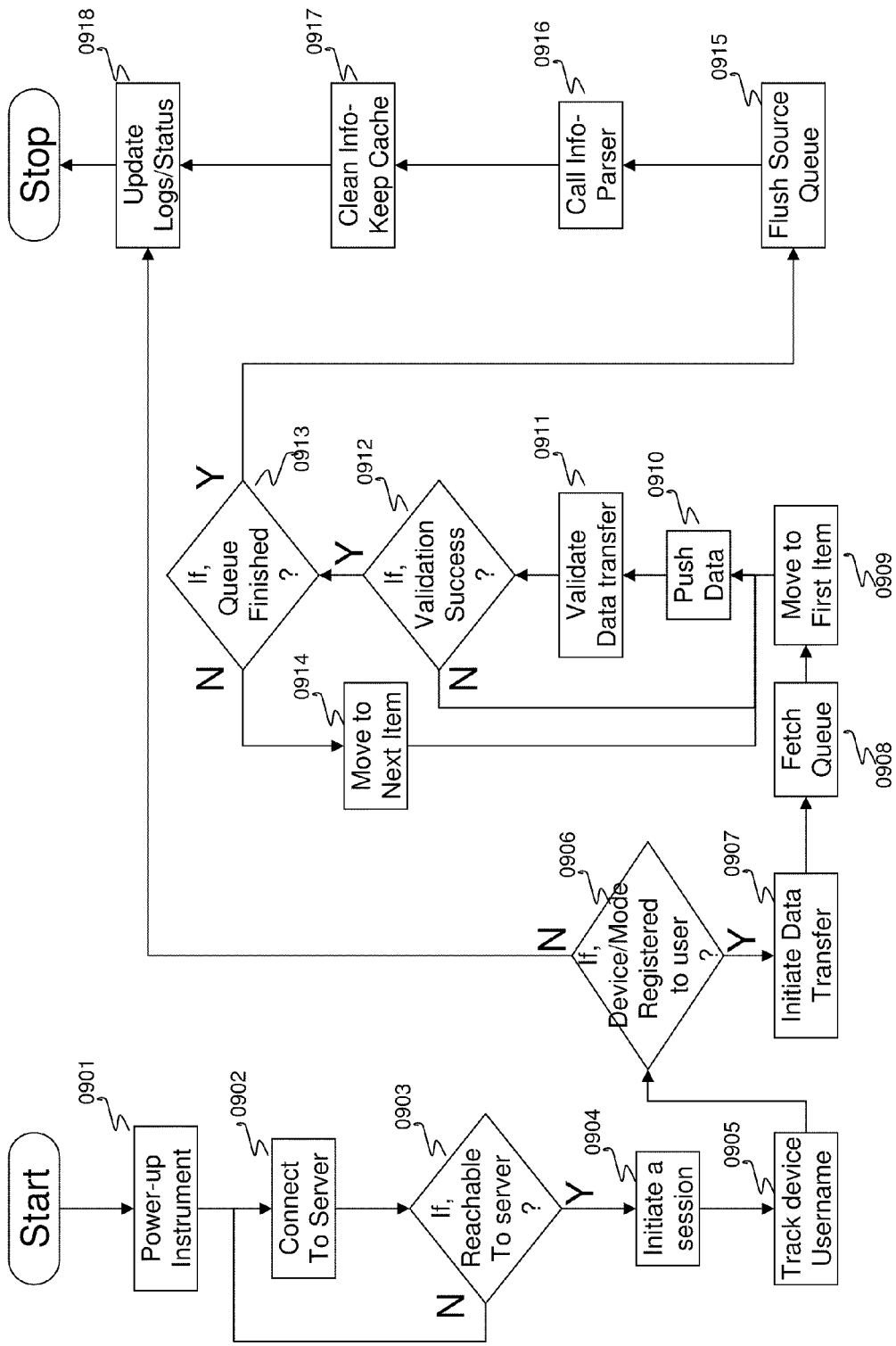

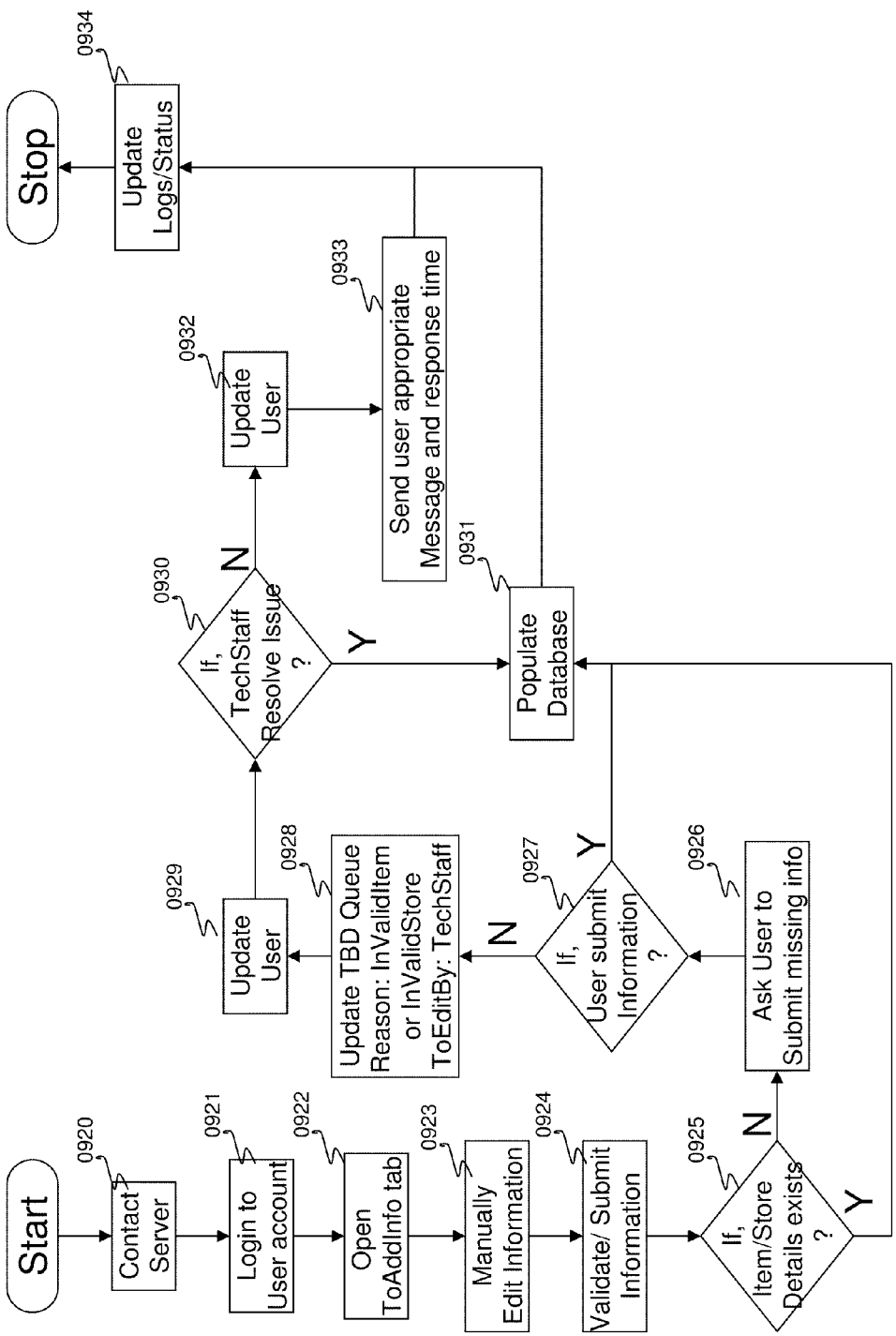

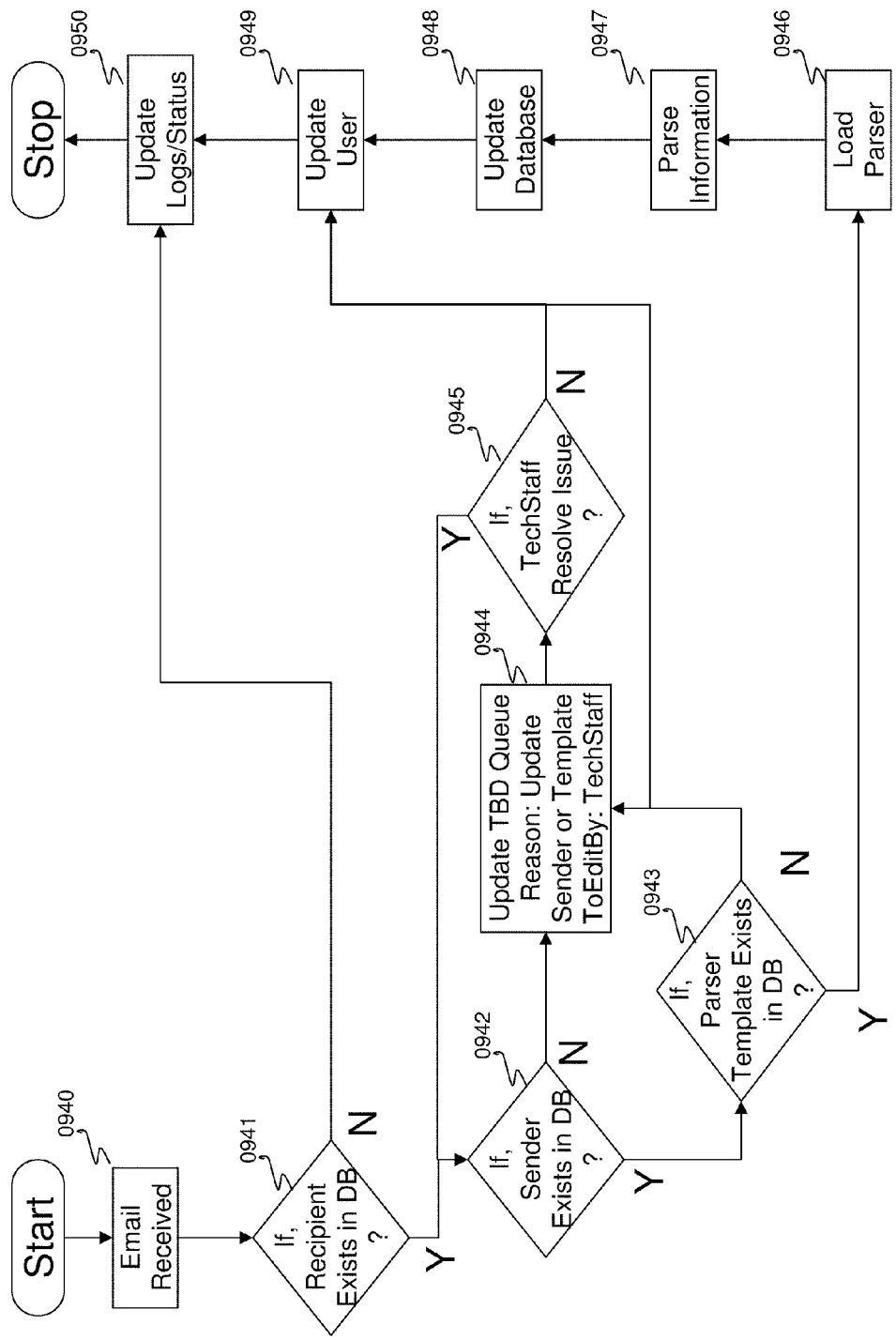
Feeder Interface III FIG. 17

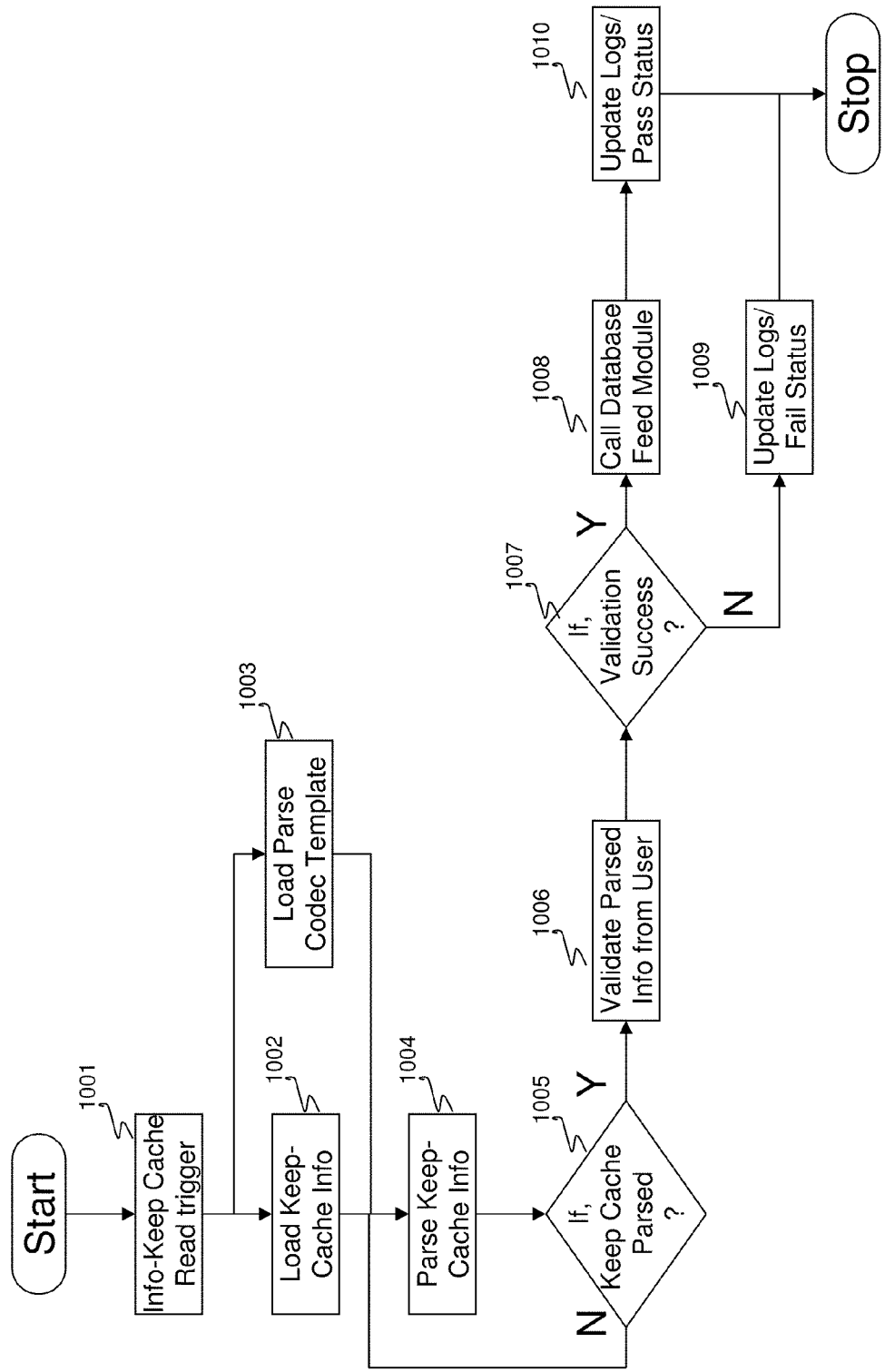

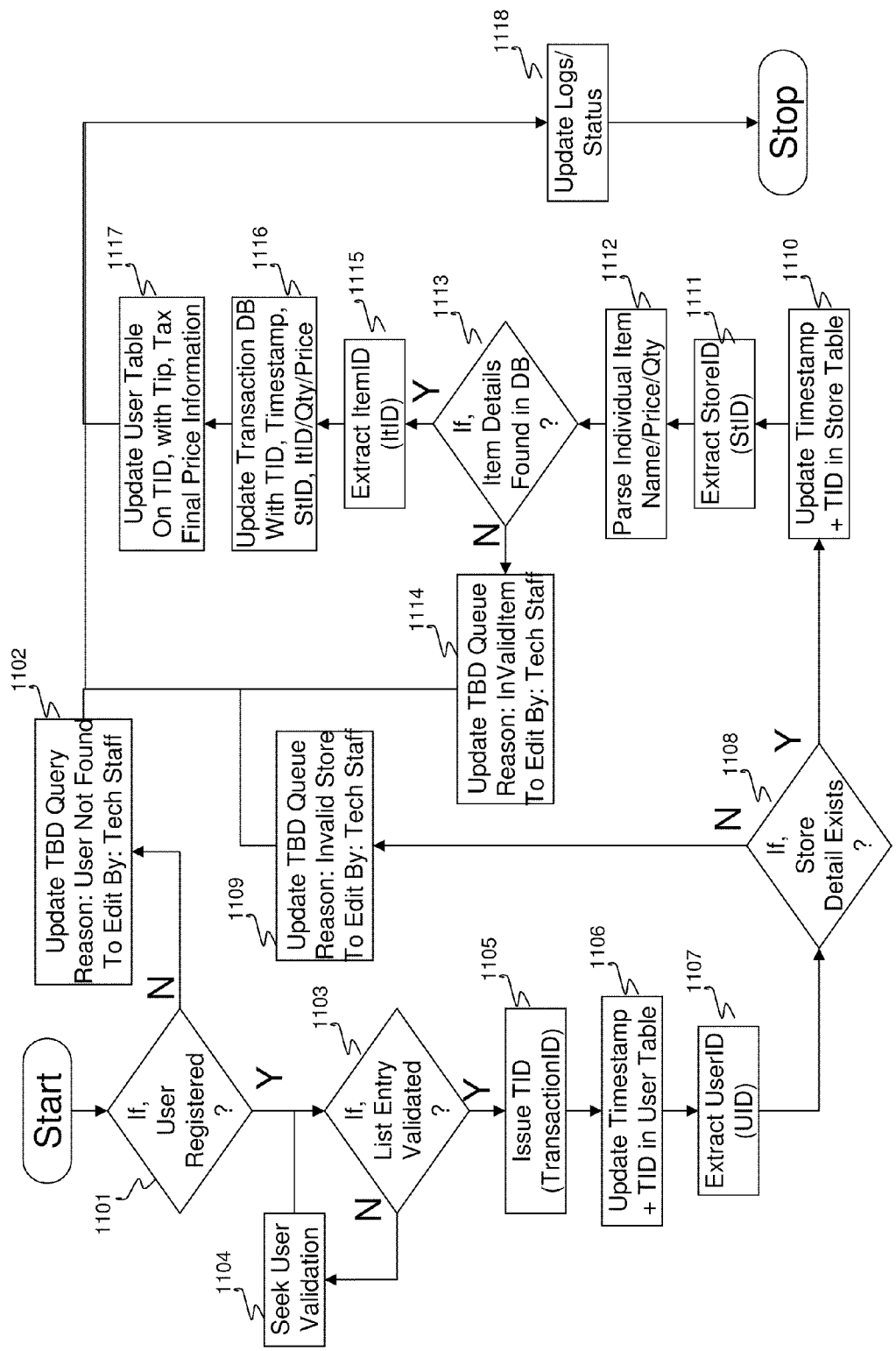
Database Feed FIG. 19

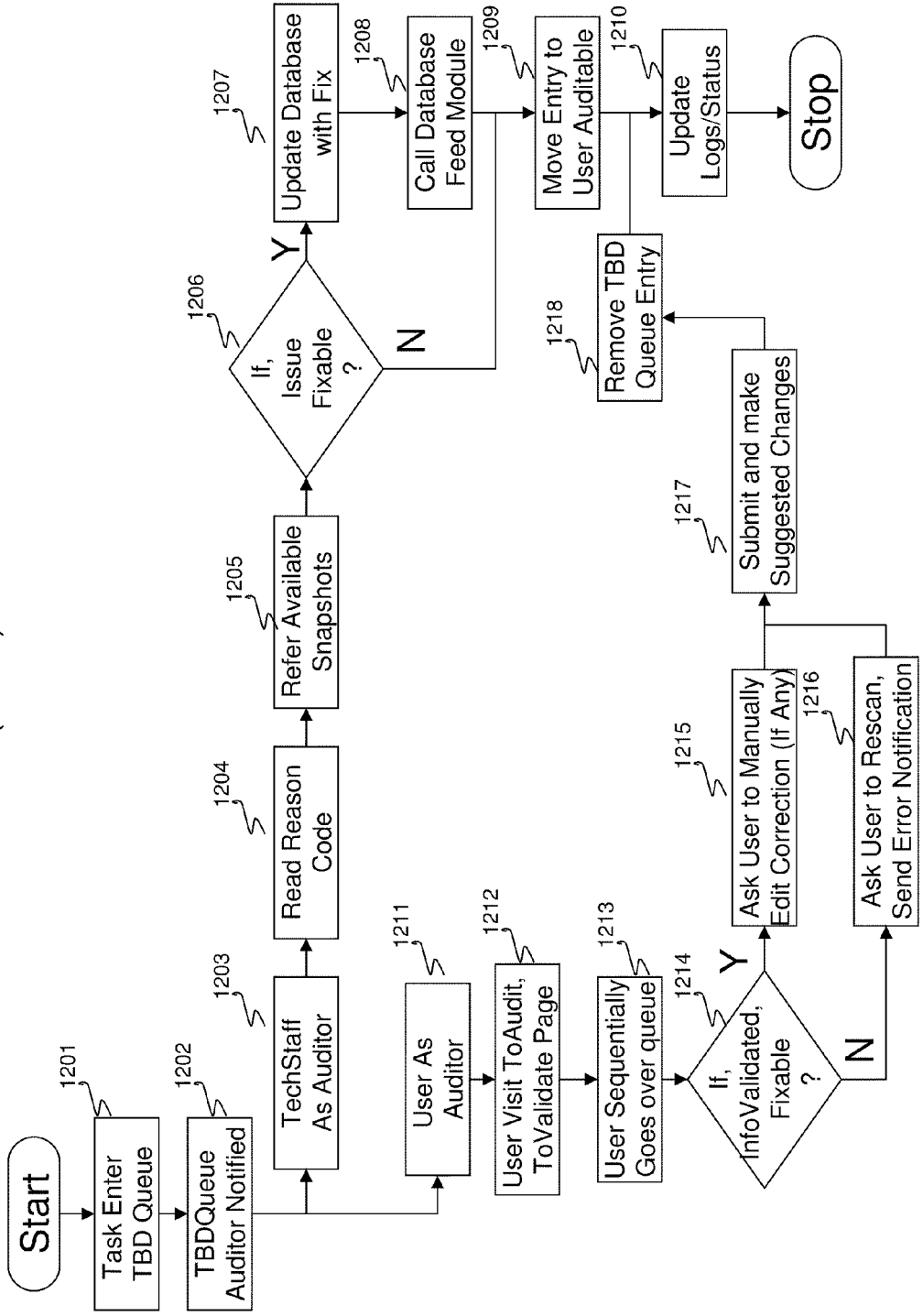
FIG. 20 To Be Determined (TBD) Queue

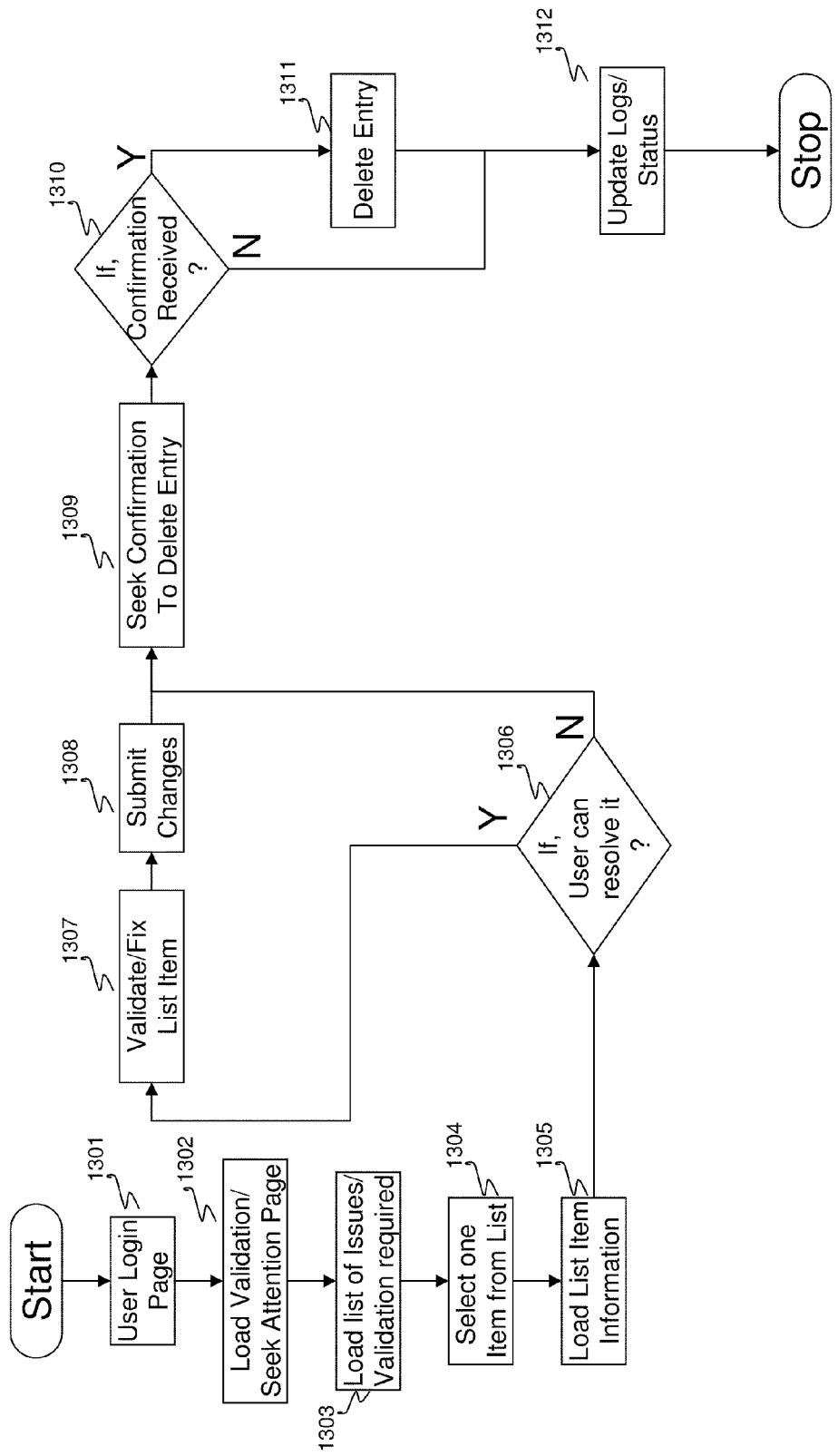
User Audit Window  FIG. 21

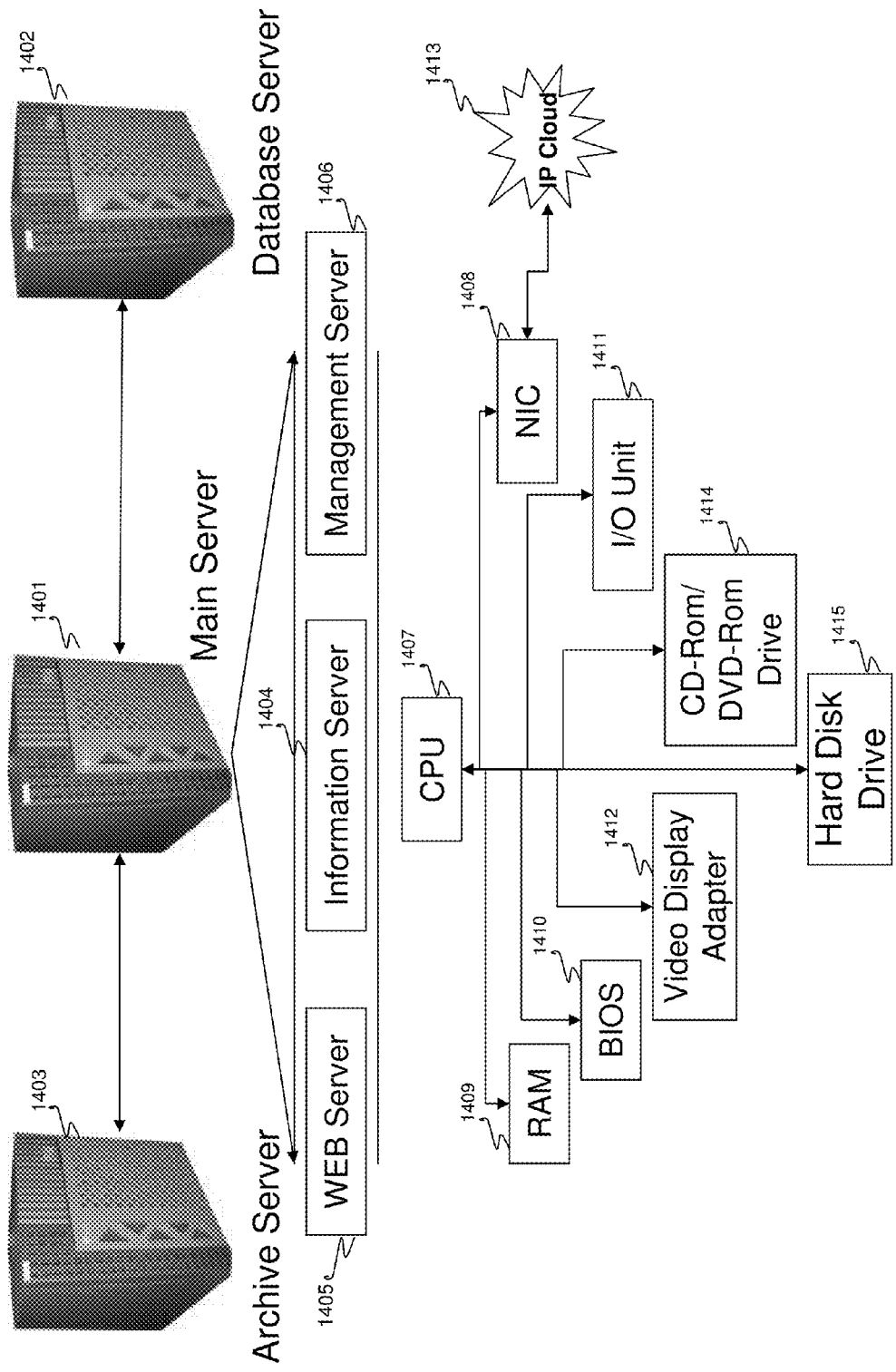

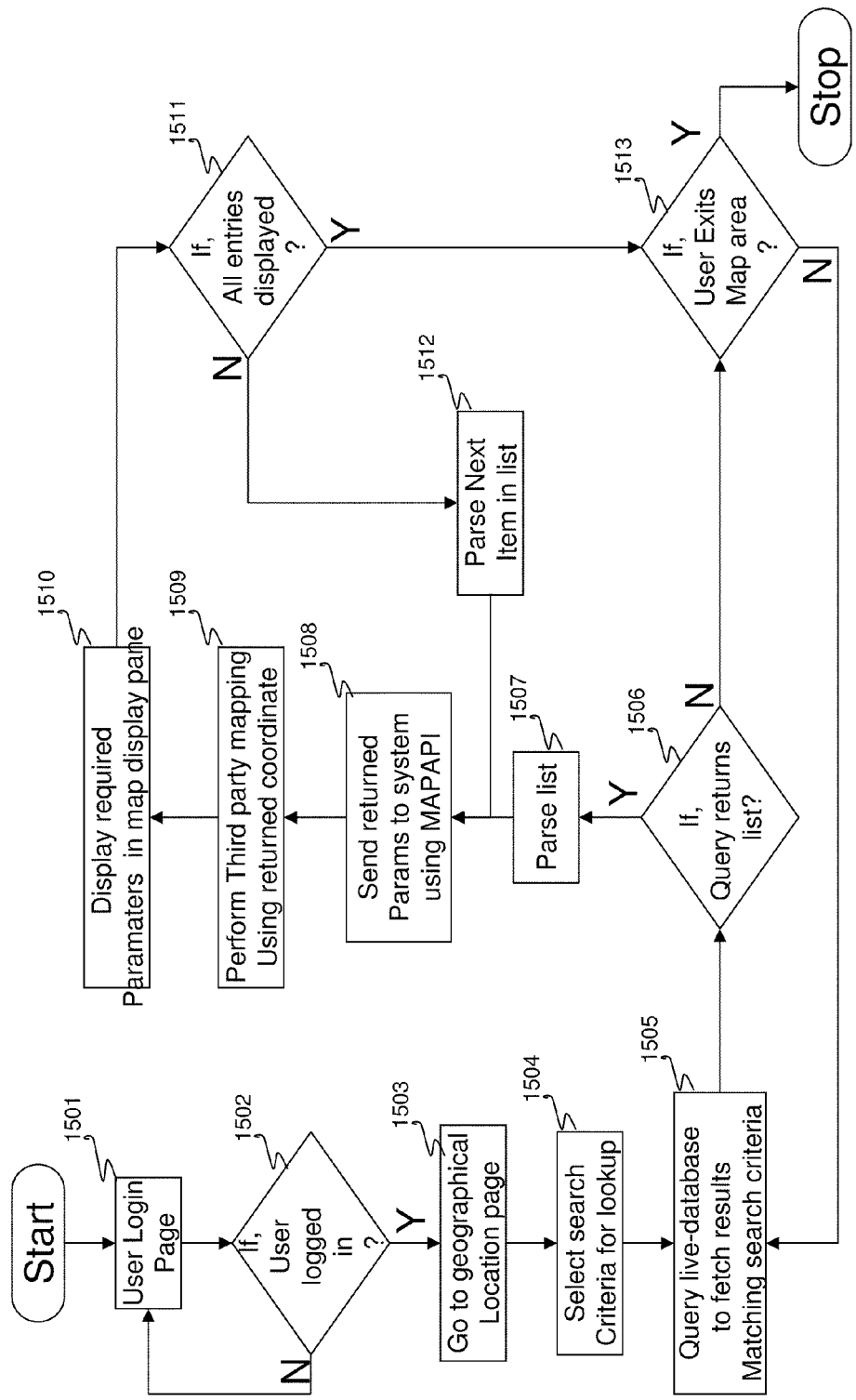
Map Representation of Purchases FIG. 23

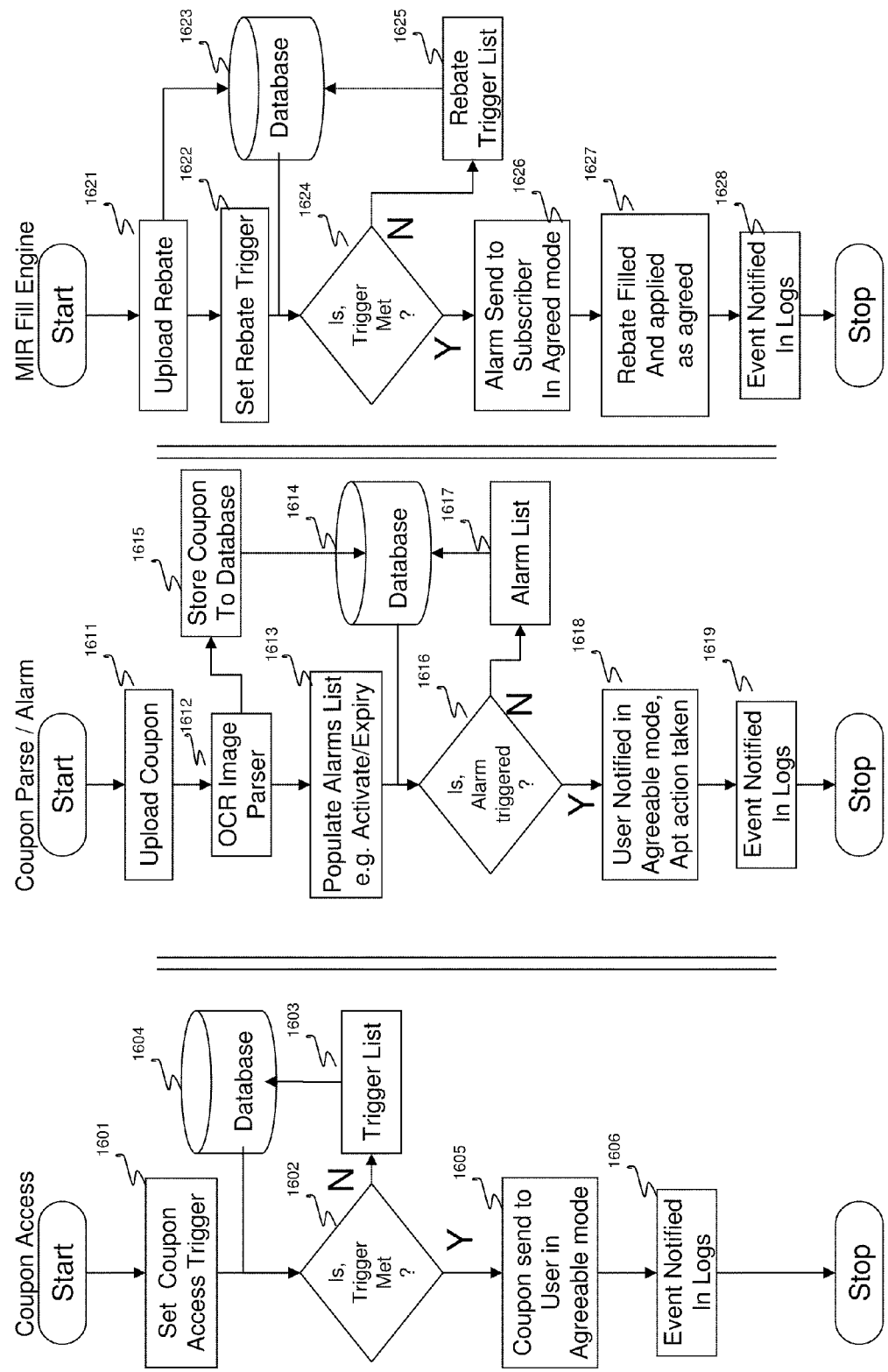
User Extended Experience FIG. 24

DISPLAY OF ANOMYMOUS PURCHASE INFORMATION OVER THE INTERNET

FIELD OF THE INVENTION

The present invention relates to methods and a business process, and more particularly, to methods and processes of using data from multiple actual purchases of items by multiple buyers from stores to provide to users of the system the ability to compare actual prices of items purchased by different buyers, from different stores and sellers, on different dates, or in different geographies. The method of comparing prices will involve receiving on a server on the Internet uploaded images of buyers' proof of purchases, having the server read the proof of purchases with optical character recognition (OCR) software, placing all the purchase information and store detail listed proof of purchase into a server database, comparing the purchases of all buyers in an anonymous database which will be used to inform users of the system of different prices from different stores at selected locations near and far, to communicate the price differences to the users via text message, email, or web interface, or to determine how much the buyers are actually spending on items over time or geography by accessing a database located on the Internet.

BACKGROUND OF THE INVENTION

Internet web sites have been comparing product features and advertised prices for products since the late 1990s. One such company is Bizrate (www.bizrate.com) which uses a "bot" and seller input to compare advertised prices of various sellers. Bizrate allows users to input information about the purchase but does not show actual purchase prices, rather Bizrates reveals advertised prices by the seller. Other Internet web sites provide a method for consumers to rate and compare products such as Digital Photography Review (www.dpreview.com) or Amazon (www.amazon.com). The purpose of the invention is to allow stores and consumers to compare actual prices of actual purchases, as opposed to advertised prices, made at different stores. Providing accurate information of actual sales to others, for example, the purchase of a dozen eggs purchased from 3 different grocery stores, has been difficult. Until this new invention, comparing and reporting actual purchases at stores has been accomplished manually by the consumer purchasing the items at the store, then going to the next store and purchasing the same items, and then comparing the purchases in a matrix. Newspapers often made this manual data available. However, the data was not capable of being updated without another manual purchase and thus would grow stale and old quickly. In addition, the manually gathered information tended to not be accurate as it could be because it involved just one purchase by one consumer on one date.

DISCLOSURE OF THE INVENTION

The prior art knowledge disclosed above just provides for comparison of advertised prices of various products. Advertised prices are useful, but actual purchase prices, actual quantity of purchases, and actual location of purchases provides much more useful information for buyers and competing sellers. No prior art provides users with a comparison of actual purchases by multiple anonymous buyers. There are no Internet web sites that compile, organize, and compare actual purchase prices made by consumers. The new invention will use standard methods of gathering proof of buyers' actual purchases by giving buyers or sellers the options of faxing, texting, emailing, SMS, photographing, or scanning images of proof of the purchases to a computer or server over the Internet. The server will use various available parsing tools including but not limited to text parser, xml parser for image using manual visual parsing, standard optical character reading ("OCR") software such as that described in U.S. Pat. No. 2,663,758 (1953) which is used to read consumer purchase information and translating it into computer code, such as the OCR used by Standard Oil Company of California in the 1950's for reading credit card imprints for billing purposes. The new invention will make use of OCR software to read the consumers' proof of purchases into a computer format. The stores selling the products may also provide information about actual consumer purchases to the server bypassing the need for the buyer to take action to transfer the information over the Internet a computer or server.

The OCR software will not be located on the buyers' or sellers' devices such as a scanner, fax, camera, cell phone, or computer but will be located on the invention's server which will be accessible over the Internet. The buyer's proof of purchase document will be turned into an image or any acceptable format and will be transported over the Internet to the server. The server or servers located on the Internet separated from the consumer's image taking and uploading device will use OCR software to read the image containing the consumer's proof of purchase. The information received from the buyers' proof of purchase image may include, but not be limited to, a description of the items purchased, the price of the items purchased, the store from which the items were purchased including location, the date of purchase, discounts that may have applied, taxes paid, any miscellaneous information about items purchased. OCR software or any parallel format parsing software used here will place each piece of this information into a database organized for each piece of information obtained from the consumer's proof of purchase document.

The database will compile proof of purchase information from many purchases and display the results on a web page using standard web browser code including but not limited to html, java, or dotnetnuke. The display presented to the viewer of the web page will be determined by the election of preferences by the viewer. Few but not all selections permitted to user includes: a) view only purchases made by the viewer within the last one year, b) view the prices of only one item purchased, for example a dozen eggs, c) comparing the prices of a dozen eggs from all the stores from which the eggs were purchased and with all the dates of purchased, d) inflation observed in user's buying habits, for example, restaurant eating prices went up, or e) election to compare the purchase prices of the viewer's actual purchases with the prices actually paid by other consumers for the same product purchased from different stores within the same city within the same month. The invention will allow viewers to instantly know actual purchase prices paid for any item purchased within multiple geographic areas, stores, or times. In the past, physical surveys of stores were required to accomplish the task of knowing what the price of a dozen eggs were at different local grocery stores. With this new invention, the prices of eggs at the different local grocery stores will be provided by hundreds or thousands of consumers on a daily basis, providing valuable and accurate purchasing knowledge for the consumer and valuable pricing knowledge for the grocery stores. Sellers and stores also can use the information to determine the type, quantity, and price of products being sold at competing stores, the location of the buyers for these products, or the identification of prospective consumers by geographical areas, by income, or by other means. In addition, vendors can use the information to determine accurate and actual purchases made in certain geographical locations which enables the vendors to make better decisions when launching new products or changing prices or targeting of existing products. User purchase information may be delivered on a geographic map on the Internet as the purchase information is delivered to the server. Those viewing the map are able to watch in real time as purchases are being made from one location to another. Users are able to elect to allow other users view their individual purchase information or other detailed information either on an anonymous basis or with a user created name basis. The output from the invention will be capable of interfacing with various social networking applications on the Internet. Users may elect to allow sellers to contact the users electronically or otherwise to advertise products to the users or to deliver other information. Users will be able to identify particular sellers who are shown through the invention. This invention may further be used by third party services for making various analysis or business decisions based on inputs provided on output related including for example purchasing habits, patterns, trends, household income, retention, loyalty to brand, or family size making purchases. Examples of third party uses include but are not limited to a) prospective market for launching products, d) identifying which products are not selling well, or e) buyers' purchases compared to buyers' family income.

DETAILED DESCRIPTION OF THE DRAWINGS

For teaching of the invention, a preferred embodiment of the system and methods of the inventions are described in the sequel. It is appreciated by the person skilled in the art that other alternatives and equivalent embodiments of the invention can be conceived and reduced to practice without departing from the true spirit of the invention, the scope of the invention being limited only by appended claims.

A typical process flow for the purchase information to be delivered to the server over the Internet is shown in FIG. 1 starting where the buyer uses, for example, a client software on the buyers's cell phone which feeds the purchase document (0111) to the server on the Internet by taking an image and immediately and automatically uploading the image through a text message, email, or browser over the Internet to the system server (0112). As shown from the images, users of this embodiment are categorized into three categories. Subscriber, Vendor and Surveyor. FIG. 1 to FIG. 3 suggest a few Subscriber Experience scenarios. FIG. 4 and FIG. 5 are used to explain a few Vendor specific scenarios. FIG. 6 explains Surveyors' scenarios.

FIG. 1 is a schematic view which shows how the Purchase Information ("hereinafter "PI") is placed into the system by the purchaser (referred herein to as "Subscriber," "Buyer" or User." Initially User submits the PI contained in a paper document from a retail store or seller, for example, through the input feeder [0111]. The input feeder [0111] includes but is not limited to a) a fax used to transfer an image of the PI to a web server, b) a camera combined with a cell phone to photograph the PI in JPEG or other format and send the PI via text messaging to a web server, c) a scanner connected to a laptop to scan the PI and then upload the image of the PI over the web to a web server, d) an email containing online purchase information, or e) any plurality of devices communicating such information to server. The PI image is sent through the input feeder [0111] to the Information Server [0112] for processing the PI further. The information server checks to determine if the PI is received correctly and also determines if the PI can be further processed [0113]. After confirming receiving of the PI, server queue is created and User validation is requested [0114]. The server may provide a budgeting service for the Subscriber which is a feature that is incorporated with this invention [FIG 1]. To understand the budgeting function further, FIG. 1 shows the Subscriber logging to server's website [0121], inserting a range of to and from dates related to the query [0122], and submitting the range of dates for processing. The system then queries database [0123] and fetches information and displays it to the User. The User is asked by the server to select a budgeting tool [0124] which has capability to parse the PI [0125]. Once the User finishes with the budgeting tool, the User logs out [0126]. Validation is another optional use of this system which validates PI that is fed into the system. The User logs into the server's website [0131] and then goes to "Audit TBD Queue" [0132]. The audit queue is maintained for all the queries seeking attention. After opening the queue, User validates the information [0133], submit changes [0134]. User sequentially audits all the queries kept in to be determined ("TBD") queue, until TBD Queue is exhausted [0135]. Financial Tools are another option for enhancing the User experience. The User logs in to server website [0141]. Then the User chooses a financial tool from variety of available financial tools [0142], and instructs the server to run the financial tool which sends query and gathers results in User selected formats [0143]. The results from using the financial tool are, for example, the quantity and prices of a product like eggs purchased during the prior year from a particular buyer, the price of gasoline purchased at various gas stations during the year, or the amount of funds spent at computer stores in the prior six months. User exits when the User is finished with using the financial tools [0144].

FIG. 2 is a schematic view which shows four Subscriber Experience Modules. The Cheapest Today module allows the User to find the lowest prices based on feedback given by other Buyers. User logs onto web site at server [0151] and inputs the information describing product for the query [0152]. The application queries the database based on User's location or other information [0153], sorts the result in ascending or descending order [0154], and delivers the results and information to the User in a selected template [0155]. Best Place To Shop module is a tool to help the User to find the best place to shop based on list of items generated by the User. The User logs onto web site at server [0161] and inputs the information describing a list of items seeking to purchase, like a grocery list [0162]. The application queries the database to fetch all stores which carry the listed entries, like competing grocery stores [0163], then sorts the result in ascending or descending order [0164] and fetches the information and display data [0165], delivering the results and information to the User in a selected template and mode [0166]. The Family PI Average in FIG. 2 is another module where Subscriber can find out average consumption by similar category of families. Categories defined are based on parameters suggested by Subscriber. The User logs onto web site at server [0171] and inputs the family annual income [0172]. The application queries the database to fetch all other families within a range of the family annual income [0173], then sorts the results in ascending or descending order by factors such as zip code or other [0174] and delivers the results and information to the User in a selected template and mode [0175]. PI Track Alarm module in FIG. 2 is used to alert Subscriber if any alarm condition on consumer spending is reached or if a certain store sells a certain product or sells a product for a particular price or price range to other Buyers inputting information. Alarm conditions can also be defined as average of set monthly amount for various types of spending like restaurants or fuel by various categories of Buyers. User logs onto web site at server [0181] and inputs the alarm policy parameters [0182]. The application parses the database to and checks alarm profile [0183], if alarm is triggered [0184] then an alarm is sent in the profile format [0185] if not then parsing continues to monitor for triggering event [0183]. Alarm information is delivered to the User in a selected template and mode [0186].

FIG. 3 is a schematic view which shows to modes of use of PI. The Product Search Using Bar Code is a mode that Subscriber can use to search for information about the queried product by supplying product identifying bar code. The search result is defined by User. User creates image of bar code with device like camera or scanner [0191] and delivers the bar code to the processing server over the Internet [0191]. The application uses bar code information to query database for similar bar code [0193], the server fetches the results of Buyers' inputted PI information for similar bar codes [0194] and delivers results to the User in a selected template and mode [0195]. The Item Information Query in FIG. 3 is a mode whereby the User supplying item information can fetch varied information about the item such as quality, supply, number of products sold, sales trends, store popularity, or other Users' opinions. The User inputs a request for information about a particular item or product [0101], the input is delivered to processor at server over the Internet [0102] and, based on the input parameters, a query is performed for information [0103]. The server fetches the results of the query [0104] and delivers results to the User in a selected template and mode [0105].

FIG. 4 and FIG. 5 show eight examples of different seller (hereinafter "Seller," "Vendor," or "User") experience modes. FIG. 4 shows the Price Match mode which gives Vendors the ability to locate competing Sellers' prices for similar products. The Vendor logs into account on the server over the Internet [0211], the Vendor inputs item name into server [0212] and based on the input a query is performed for item pricing information [0213]. The server delivers to the Vendor the results of prices of items at competing sellers based on various inputs such as zip code [0214]. The Top Search mode helps Vendors find the best or top products in any Vendor defined vicinity or parameters. The Vendor logs into the account on the server over the Internet [0221], the Vendor inputs query for top sales item by location or other parameter on to the web server over the Internet [0222] and based on the input a query is performed by the server for based on the request [0223]. The server delivers to the Vendor results of top sales information of based on various inputs such as zip code [0224]. The Loyalty Search mode provides information about the Subscribers, who made multiple purchases of identical items or repeated events as show from Subscribers' PI. The Vendor logs into account on the server over the Internet [0231], the Vendor inputs a query for information about types of Subscribers who performed multiple purchases of identical items or repeated events by location or other parameters on to the web server over the Internet [0232] and based on the input a query is performed by the server based on the request [0233]. The server delivers to the Vendor results of Subscribers' characteristics based on various inputs such as zip code [0234]. The Vendor Tools mode is a placeholder to provide vendors with various other Vendor requested tools to help the Vendors understand and study multiple behaviors of the Buyers based on the PI. The Vendor logs into account on the server over the Internet [0241], the Vendor inputs query for the Vendor-focused unique tools on the web server over the Internet [0242], then server loads Vendor tools [0243] and searches the databases following tool requirements [0243]. The results are then displayed by the server on the Internet to the Vendor [0244]. If Vendor has another Tool request cycle is repeated [0236]. Once a Vendor tool request is created the Vendor Tool request template may be available to all other Users of the system.

FIG. 5 continues with Vendor experience modes showing the Average Customer Spending mode which delivers information such as how much an average User is spending at a particular store or and defined locale. The Vendor logs into Vendor's account on the server over the Internet [0251], the Vendor inputs query for information about types of Subscribers average User spending by store, dates, location or other parameter on to the web server over the Internet [0252] and based on input a query is performed by the server on the request [0253]. The server fetches the results of average Subscribers' purchases based on various inputs based on ascending or descending order [0254] and delivers results to Vendor in a Vendor selected or default template and mode [0255]. In another Vendor experience tool the "User Sending Per Income" mode the Vendor is able to discover information about Users' purchasing power based on income for any category, item, or location. The Vendor logs into Vendor's account on the server over the Internet [0261], the Vendor inputs query for information about Subscribers based on Subscribers' income ranges for information such as spending by store, dates of purchases, location of purchases or other parameters on to the web server over the Internet [0262] and based on input a query is performed by the server on the request [0263]. The server fetches the results of Subscribers' income based on various inputs based income, location or other parameter [0264] and delivers results to Vendor in a Vendor selected or default template and mode [0265]. Prospective Customer mode in FIG. 5 delivers a list of particular groups of Users such as by location or purchases of similar products and product prices in competing stores. Such information can be used to target particular groups of Users' based on buying patterns. The Vendor logs into Vendor's account on the server over the Internet [0271], the Vendor inputs query for information about Subscribers based on location, item, or other category to the web server over the Internet [0272] and based on input a query is performed by the server on the request [0273]. The server fetches the results of Subscribers' group characteristics based on various inputs [0274] and delivers results to Vendor in a Vendor selected or default template and mode [0275]. The Top Store Per Category Per Zip Code mode delivers information of leading Vendor competitors in defined category such as zip code. The Vendor logs into account on the server over the Internet [0281], the Vendor inputs a query for information about the top store sales based on location, item, or other category on to the web server over the Internet [0282] and based on input a query is performed by the server on the request [0283]. The server fetches the results of top stores in descending order regarding various parameters such as zip code, number of purchases, User opinions, total reported sales based on PI, or prices of items [0284] and delivers results to the Vendor in a Vendor selected or default template and mode [0285].

FIG. 6 explains four examples of experiences used third-party surveyors ("Surveyors") of the system. The First mode, the Product Launch Pad, is used by third party surveyors ("Surveyor") in finding a prospective market for launching a new product. This will be done by seeking information such as aggressive purchase history and lifestyle information of the Users. The Surveyor logs into online account to use the Product Launch Pad mode [0301]. After logged in, the Surveyor inputs query for information included but not limited to the item being currently sold by a Vendor, information about a group of Users, information about sales in a geographic area, information on type of stores presented and the stores' items sold list [0302]. Based on the input, a query is performed to database by the server [0303]. The server fetches the results of requested information in descending or ascending order for various parameters including and not limited to zip code, number of purchases, User opinions of PI, total reported sales based on PI, prices of items, or groups of Users' parameters [0304]. The Product Launch Pad results are then delivered to Surveyor in a mutually agreed upon default template and mode [0305]. House Income Per Zip Code mode is a tool that delivers the average income of Subscriber living in a particular area. This house per income per zip code information helps the Surveyor in gauging information including but not limited to income, lifestyle in a particular area. The result obtained is filtered to provide various useful outcomes. After login account to use the House Income Per Zip Code mode [0311], the Surveyor feeds a query to fetch household income based on zip/pin code or few zip codes selected [0312]. The Server queries database [0313]. The System fetches the results for requested query in descending or ascending order [0314] and delivers results to the Surveyor in a mutually selected or default template and mode [0315]. The Spending Survey mode in shows the average spending power for users based on indicators including but not limited to geographical location or Buyers' household incomes. The Surveyor logins the account to use the Spending Survey mode [0321]. The Surveyor inputs query for information about a groups of Buyers based on but not limited to spending by income or zip code [0322]. The Server queries database [0323]. The Server fetches the results of requested information in descending or ascending order for parameters including but not limited to a) zip code, b) number of purchases included in the PI, c) Buyers' opinions, d) total reported sales based on PI, e) prices of items, or f) groups of Users' parameters [0324] and delivers the results to the Surveyor in a Surveyor selected or default template and mode [0325]. The Surveyor Tools mode shows a placeholder to provide various tools to help Surveyor in make use of the PI database. The Surveyor logs into the system over the Internet [0331], the Surveyor inputs query for Surveyor focused unique tools on the web server over the Internet [0332] and then server loads Surveyor tools [0333] and searches the databases following tool requirements [0334]. The results are then displayed by the server on the Internet to the Surveyor [0334]. If the Surveyor has another Tool request, the cycle is repeated [0336]. The server delivers to Surveyor results of Subscribers' characteristics based on various inputs such as zip code [0335].

FIG. 7 shows an example of three additional User Extended Experiences. One of the User Extended Experiences cases shown in FIG. 7 is the Purchase List Update. The Purchase List Update is a feature where the Subscriber creates a purchase list for the items that the Subscriber is seeking to purchase. The item list is thereafter maintained on the server system and Subscriber is able to download the item list. Upload and download for the item list can be done using any compliant device including but not limited to mobile phone, computer, notebook, and any plurality of such devices capable to communicating such information with the server. FIG. 7 shows how the Purchase List Update works showing that the Subscriber logs into system and send purchase list using any configured and mutually agreed device [0341]. The system validates the source [0342]. After validating the source, the system creates or updates an existing purchase list [0343]. After updating the list information, confirmation along with modified list table is sent back to requesting system. The Subscriber is also able to attach a PI Document while updating purchase list. Attaching a PI Document not only updates purchase list but also updates database with the PI document. To use image attachment feature, an API or similar tool is provided which is capable of communicating PI information and would be able to send update with attached image. To use this capability, the Subscriber first downloads purchase item list [0361]. The Subscriber then edits purchase list [0362] with modifications including but not limited to an item purchased, an item cancelled, or items added. The Subscriber then attaches the image with the purchase list [0363] request and sends it back to system server [0364]. The Server analyzes the uploaded information and as needed processes the new information and responds the Subscriber with changes and an update confirmation [0365]. Another useful User Extended Experiences case derived from the system is to be able to upload location for sites including but not limited to Subscribers' addresses, purchase sites, purchase document upload locations, or purchase list update locations. To use the system, the Subscriber first communicates information to server of location if known and the location of the Subscriber for upload [0351], the system validates the request [0352]. Once the request and session are validated, the system checks if other locations are sent as an update and, based on the Subscriber's profile, configures and updates logs with location updates [0353]. The location log is then be used to update the geographical map on server to show all possible locations [0354], an API is also provided to download location information to other members as acceptable by Subscriber. The geographical map is displayed to all Users on the Internet showing PI information as it is uploaded to the server showing location of the Vendors, the prices of the items, amount of items, or location of the Subscribers. The result is then send back to the Subscriber, if requested by Subscriber, and the system logs are updated [0355].

FIG. 8 shows an embodiment of from a high level view of the PI system. The system show the input/output which the Subscriber uses to feed raw data [0401] and take output/results [0405]. The Database [0404] is used to store all the required information tagged with query engine [0403]. All these components are controlled by central module called Information Processing Module (also referred as "IPM") [0402]. This high-level diagram is further explained in it's constituent parts in FIG. 9, FIG. 10, FIG. 11, and FIG. 12.

FIG. 9 shows the Input Interface also called the Feeder Interface of the invention. The Input Interface [0502] is used to take the feed from the Subscriber, Vendor, or Surveyor for the invention and use the feed to populate database for providing all the information required to run this system. Input box interface [0504] is any compliant input device or application that can deliver an image or feed over the Internet to the IP Interface such as a PDA, Scanning OCR device, Pocket PC, Email, Fax, Communicator, or MMS. The Information Processing Module [0503] processes the information delivered to and then sends the results back through the IP Interface, to the Internet cloud, to the Internet to multimode communication application [0501] and then to the Input box interface [0504].

FIG. 10 shows how the information is connected to its respective databases [0601]. FIG. 10 shows how the query engine [0603] is tagged to various database servers through the database server [0602]. FIG. 11 shows how a communication happens in IPM.

FIG. 11 explains how Feeder aggregator interface [0714] communicates PI or data requests to the Information Processor [0708] Output interface [0701] and Databases servers are tagged together.

FIG. 12 shows how a communication happens in IPM. FIG. 12 shows the interactions within various modules in IPM to make the system work. The Feeder Module feeds the information in the system using Input Interface module [0713] to Information Keep Cache [0712]. This information is decoded using Data-Fetch module [0711] and then sanitized using Information Sanity Check module [0710]. Once sanitized, an acknowledgement is sent back to feed system. The sanitized information is then fed to Information Processor module [0708]. The Information processor module will send this information to Validate Information queue [0703] for information to get validation from system and the Subscriber. Once validated, the system will send the information into main database [0707] using a query engine [0706] by Information processor module [0708]. Another piece to the workflow is interaction with other Subscribers, Vendors, Surveyors and the system maintains, outside the network to fetch queried information. This information is be fetched using an Aggregator [0714], which aggregates information from server and outsider server and supplies this information to Information Processor module [0708]. Supplied information is then processed and using a query engine internal or external to system the expected result is fetched from server, system, and local cache. Another part of this process that is pushing information processed to output devices. The Information Processor [0708] may be used to send processed information to output device, it will do so by placing information in Information Keep Cache module [0702] which is then linked to Output Interface Module [0701] which then pushes information out to Output device. A Log/Status Module [0709] is linked directly or indirectly to all modules and provides continuous reporting, maintaining of logs for activities being performed by the system. The Log/Status Module is the linked to the Health Check Module [0704] which keeps track of activity and alarms the system if any exception or non-traditional behavior occur. The Codec Database Module [0705] is another module used to help with deciphering or ciphering information belonging to the Information Keep Cache Module [0712].

FIG. 13 to FIG. 20 show various processes involved, in the invention. FIG. 13 and FIG. 14 describe Output interface process and list two typical roles assigned to this module. FIG. 13 explains process to show login templates or results for the queries based on login profile for Subscriber, Vendor, Surveyor, or guest. Depending on the Subscriber status and profile tagged to the status, information is filtered and displayed and login is created, if required. FIG. 13 shows one of the processes flow to explain output of the information on a website, client software, API or Internet portal. The Subscriber logins to account access page [0801]. If a Web user is logged in, it is defined as a Guest [0802], if a Web user is not logged in the system seeks User authentication, or treats the session as Guest session and moves ahead to load a guest template [0809]. If Web user is not a Guest, the User is asked to provide account details [0803]. If the User exists [0804] in the system the User is authenticated, if not the User is asked to open a new account [0805] or is asked to retry login for set number of times. If the Web User chooses to create a new account, the User is asked to enter account details [0806] and the system then checks if details provided are acceptable [0807]. After User details are accepted, an account is created and the User is sent back to access page as nor Guest nor account holder [0801]. If the User exists [0804], the system checks to see if a session is already in place for the User [0818] and a User specific template is displayed [0818], or the User is treated as Guest and a Guest template is displayed [0809]. As a Guest, the User is displayed all Guest options [0810], whereas logged in User is displayed with all account specific options [0820]. If the Web User decides to submit a query [0811], the system checks to determine if the query is to Logout [0812], if the answer is yes, the session is terminated [0813] and the logs are updated. If the query was not for a logout, the Information Processor Module [0708] is used to fetch the desired results [0816] from submitted query [0815]. Results are then displayed to the User [0817].

FIG. 14 shows a failure scenario associated with this invention. FIG. 14 covers various possible issues associated with finding the results of a query and raising appropriate exceptions or alarms and alerting the needed profiles. FIG. 14 shows another output process flow for submitting a query to the system. Initially, the device handshakes with the system and submits a query with account details and the specific query to be submitted [0821]. The System checks [0822] to determine if the Information-Keep Module [0702] has successfully received the query information. If the Information-Keep Module has not received the query correctly, an error is generated and the device or interface is requested to produce information again. Using a Codec database [0705], the system checks to determine if information is able to be parsed [0824], if the information can not be parsed then an error is generated and the system log is updated [0823] along with messaging output interface to resubmit the query or stop trying. The parsed information is then deciphered in system understandable format [0825]. If information exists in database [0826], information is sent back to the User in a User agreed template and medium [0832]. If information is not found internally in the User's account, an aggregator [0714] is used to fetch information [0827] from outside the server or from other accounts within server. If information is found and entered in database [0828], the fetched result is submitted to the User [0832], or the tech-staff is flagged to pitch in resolve incomplete query [0829]. If tech-staff is able to fetch information and enter the information into database, the fetch successfully delivers the results to the User [0832], or sends an update to the User indicating a failure to procure said information with appropriate message [0831]. The activity is then logged to system.

FIG. 15 to FIG. 17 show how two typical Feeder processes associated with this invention work. FIG. 15 shows how a stepwise scenario for feeding the system with PI, which is main feed required to run the invention. FIG. 15 covers the in-process fault and issue finder and resolves the steps. FIG. 16 shows the manual editing aspect of the invention. After an automated feed requires manual attention, the manual input is handled using similar process as show in FIG. 16. FIG. 17 explains a scenario of receiving the PI document through received, forwarded, or replied emails. FIG. 15 explains one of the basic information feed scenarios. The Input device is powered up [0901], which then starts a lookup for the server sending connection requests. The Device retries [0903] for limited number of times if connectivity fails. If connectivity is passed [0903], the session is established with server [0904]. The Device ID, such as mac address and user ID, is tracked [0905]. If Device and User match failed in system [0906], failure message is reported and logs are updated [0918]. If device and user information matches the information contained in the Database [0906], a data transfer is initiated [0907] and information is then fed to Information-Keep Cache [0712]. A list gathered from the device is parsed in first in and first out format. The first item is fetched [0909] moving up with pushing this first element [0910], validating information [0911], and upon the validation success [0912], the cycle looks for more items left in the queue [0913]. If more items exist, the next item is pushed [0914]. If all entries in queue are submitted and make it to database, the queue is flushed [0915] for making room for more queries. The Information-parser [0916] is then called, following deletion of the entry from Information-Keep cache [0917] and the logs are updated.

FIG. 16 shows another instance of sending feed to system manually. User visit website [0920], login to system [0921]. Goes to Adding Info tab [0922]. User uploads image using browser and manually feed information into the system [0923]. After entering, validate and save this information [0924]. System then checks for all necessary information [0925], if not found user is asked [0926] to provide information. If user has means to provide information [0927], database is validated and updated [0931], else a TBD request query is generated for handling by tech-staff [0928]. User is update about the action [0929]. If tech-staff able to solve the issue [0930], information will made it to database, else user is updated [0932] and appropriate message explaining situation is send about failure [0933]. If necessary information exists in manual edit [0925], database is populated [0931]. Following this appropriate message is generated [0934].

FIG. 17 shows an instance of sending a feed to the system, using the system emails or any forwarded, replied, normal received email. The System, when receiving an email [0940], checks for presence of a User [0941] on the system database [0941] and not finding one, the system drops the request and updates the system log. If User exists [0941], the system checks to see if sender account exists in database [0942]. If sender account does not exist [0942], a TBD request is generated [0944] for the tech-staff to resolve the issue by checking authenticity of the email and if the tech-staff finds the sender account to be authentic, the request is submitted into system. If sender account exists, the system checks to see if there is a parsing template exists [0943] in Codec Database [0705]. If the template is not found, another TBD request is generated to study template and add it to system. For every TBD request, an update is send to User [0949]. If tech-staff is unable to resolve the issue [0945], an appropriate message is send to User and system log is generated. If tech-staff resolves the issue, the process recycles from sender validation. If the parser is found in the system [0943], the parser is loaded [0946] and, using an existing template, the information is parsed [0947], the database is updated [0948], the User is updated [0949], and the system log is generated [0950].

FIG. 18 shows how the Information Parser Module works in Information Processing Module. The Information Parser Module receives information from Feeder interfaces and parses the information received into database compatible format and pushes the information to databases. The Information Processing Module also handles failures or inaccurate scenarios and a manual validation by Subscriber feeding information is tagged in the process. FIG. 18 shows a typical work flow in Information-Parser Module which is a collection of Information-Keep cache [0712], Information Sanity Check [0710], the Data-Fetch Module [0711], the Information-Processor [0708] and the Codec Database [0705]). In the process flow, information is translated from fed form to the system in an understandable form. Once the Information-Keep Cache is read, a flag is triggered [1001] and two simultaneous process takes place: the Loading Keep Cache Information [1002] and the Loading Parsing template [1003]. The Information parsing [1004] takes place after the Loading Parsing. If the Information parse is successful [1005], the information is sent to the User for validation [1006]. Once validated from the User [1007], the databases are updated [1008]. In either case, the User query updates and the system logs are updated [1009 and 1010].

FIG. 19 shows the process to populate database. Data is altered to match compliant database, which includes adding various flags and IDs and storing them in the database. The process also involves steps to counter any error or issues occurring while converting data from raw fed format to database compliant information. FIG. 19 shows one User case involving feeding the PI to the database. When database query to submit feed PI is sent, the system checks to see if the User is registered [1101]. If the User is not registered, the TBD query is updated [1102] to reflect no User exists and system logs are updated [1118]. If the User is registered [1101], the system checks to see if list is validated [1103]. If not, a User validation is requested [1104], or a Transaction ID (TID) is issued [1105]. Following a TID generation, a timestamp of TID generation and TID with User ID is updated in database [1106]. The User ID (UID) is extracted from database [1107]. The system then checks to see if the Vendor exists in the database [1108], if not the tech-staff TBD is issued to resolve store details [1102]. If a Vendor exists in database [1108], the Vendor table is updated with TID and a Time Stamp issued [1110] following extraction of a Store ID (StID) [1111]. A list of purchases are then parsed one at a time [1112]. If the item being parsed is not found in the database [1113], another TBD query is issued for tech-staff to resolve the issue [1114] and system log is generated [1118]. If the Item is found [113], the Item ID is extracted (ItID) [1115], and following the updating of the TransactionDB with TID, Time Stamp, StID, ItID, quantity, price, and notes [1116]. The User Table is also updated with TID, Tip, Tax, and Final Price Information [1117], an update message is sent to the User, and a system log is generated [1118].

FIG. 20 shows another important component of the PI system using ("TBD") queue. The TBD queue is created to facilitate a Subscriber and tech service to issue problematic queries before the input feed is delivered to the database. The required profiles can visit respective TBD queue list and repair the issues and push the query so that the problematic query is delivered into the database for processing. FIG. 20 shows the process flow within TBD queue. TBD queue are generated at two levels, tech-staff and User. When a task is entered in TBD queue [1201], the System reads the auditing authority and requests an audit message to be sent [1202]. If the Tech-Staff is chosen as auditor [1203], a reason code is read [1204] to understand the problem, and available snapshots are reviewed [1205] to resolve the issues. If the issues are resolved [1206], the database is updated with the fix [1207] and the database feed module is called [1208]. In either case of tech-staff fixed or not fixed, an entry is moved to the User auditable mode [1209]. If TBD queue entry is User auditable [1211], the User should be able to enter whenever logged in to system [1212], and the User may parse these TBD queue entries one at a time [1213]. If the User fixes the problem and validates the fix [1214], a request is made to manually enter the fix [1215]. If the information is not fixable by User [1214], the User is requested to rescan the Information and send it again or drop the changes [1216]. In either case, the change is submitted [1217] and an entry is deleted from TBD queue [1218]. In all cases, the updates are sent to the User and logged into system [1210].

FIG. 21 shows a scenario where the User is be able to audit information fed to the system. Since the information fed is personal and financial, this process is made mandatory for User. When a User logins to system [1301] and visits the Validation page [1302], items awaiting the User's attention are loaded as a list of issues [1303]. The User selects one item at a time in any order [1304]. The Item selected loads all the relevant information for User's attention [1305]. If the User agrees on the content and can validate this information [1305], the User validates the information [1307] and submits the information to database [1308]. If the User is unable to resolve the problem or has resolved the problem, the User is asked to delete the entry [1309] and confirm [1310]. The entry is deleted on confirmation [1311]. The User is updated on the action and system logs are updated [1312] as well.

FIG. 22 shows the server system components and shows which servers are used with the required components. FIG. 22 shows the components of the server that are needed for this system. A list of hardware equipment needed in the server includes but is not limited to RAM [1409], Network Card [1408], bios [1410], I/O Unit to handle all possible I/O modes [1411], video display adaptors to handle server management [1412], Optical Drive [1414], and a reliable storage medium [1415]. On the application front the system comprises of three servers: a) an Archive server [1403] to archive old records, b) a Database server [1402] to manage database and main server [1401] which includes and not limited to web server, and c) an application server and email server.

FIG. 23 shows the process involved with displaying the location for any places on a geographical map using the Internet including showing the location of the Vendor where a PI was created, the PI upload location, or the PI Buyer's location. FIG. 23 shows a method by which the User is able to find purchases being made in locations for items desired and the locations of concern based on the User's search criteria. To access the map feature, the User visits the login page of the system [1501], after login [1502] the User visits a geographical map location display page [1503] on the Internet. The User submits search criteria for lookup [1504]. The System then generates a query and requests live database to display updates as they happen for that query [1505]. For every query return [1506], the system parses the list [1507] and uses the longitude and latitude information about the location of concern [1508]. Using third-party or any available coordinate mapping tool [1509], the system displays required parameters on map [1510] and keeps on looping through list [1511] until user decides to quit the page [1513].

FIG. 24 shows the process involved with a User uploading warranty, coupons or registration information for a Vendor in conjunction with uploading the PI or without uploading the PI. [1610] FIG. 24 shows a method by which the User is uses an input device like a cell phone with camera or laptop with camera to procure an image of a warranty card, coupon or registration with or without an image of the PI [1611]. The warranty, registration, or coupon are uploaded to the server [1612]. The server takes the User's account information such as address, email and phone number and PI information such as store, price, and product ID, and delivers all the information required by the Vendor or product distributor to the Vendor or product distributor by fax, email, or if required postage service [1613]. The server also stores the coupon, warranty, or registration for retrieval by the user when the user makes a request for the coupon, warranty, or registration by sending a signal to the server by email, SMS, text, or through a browser. The server will deliver a copy of the coupon, warranty, or registration to the user's mobile or non-mobile device sorted by store, date, item or other category.

FIG. 24 shows the process involved with a User uploading coupons information for a Vendor. [1611] FIG. 24 shows a method by which the User is uses an input device like a cell phone with camera or laptop with camera to procure an image of a coupon [1611]. The coupon is uploaded to the server [1612]. The server stores the coupons in a special section for the user which can be sorted by date of expiration, item in coupon, or store for coupon [1613]. The server also stores the coupon for retrieval by the user when the user makes a request for the coupon by sending a signal to the server by email, SMS, text, or through a browser. The server will deliver a copy of the coupon to the user's mobile or non-mobile device sorted by store, date, item or other category.

We claim:

1. A method of compiling, organizing and comparing purchase information by a server-based system managing a database accessible over the Internet, said method comprising:
   receiving at the server for each buyer having made a purchase of one or more items or services from a seller, the purchase information including actual prices paid for the one or more items or services by said each buyer, wherein the server accepts:
      said each buyer's purchase receipt documents or images of purchase receipts received by the server over the Internet directly from said each buyer's mobile computing device or non-mobile computing device; and
      said each buyer's purchase information including the actual prices paid by said each buyer for the items or services directly from said seller to the server over the Internet;
   storing the purchase information in the database and compiling the purchase information to facilitate comparisons; and
   displaying by the server to users in an anonymous or alternatively open fashion on the Internet certain portions of the purchase information in part or in the aggregate, the purchase information comprising:
   the actual prices paid for the one or more items; and
   a count of items purchased.

2. The method of claim 1, wherein the aggregated purchase information located on the database is shared with other users, sellers and surveyors through the server managing a website database accessible over the Internet.

3. The method of claim 1, wherein the purchase information is delivered from a purchase information document format over the Internet to the server, and the server inputs the purchase information into a database that is accessible by users on the Internet, and the database displays or transmits to users various data and comparisons of the actual purchase information.

4. The method of claim 1, wherein transferring the actual purchase information to the server on the Internet is by converting the said buyer's proof of purchase document, including but not limited to the paper receipt, from a printed document provided to said buyer by the seller into an electronic format including but not limited to text file, xml file, bin file, or image including but not limited to JPEG, PNG, BMP, GIF, TIFF, or any other image format using the buyer's electronic image device including but not limited to webcam, camera in a mobile computing device, mobile phone, digital camera; fax, scanner or other device and transmitting such electronic image over the Internet to the server and the server receiving the purchase information using a parsing method including but not limited to a text parser, other plurality of parsers for handling non-image versions of data, manual parsing by people viewing the data from the purchase information and inputting the data into a template, or using standard optical character recognition (OCR) software which reads the images and places the text and numbers from the proof of purchase information images into the server database for the purpose of displaying the information to various users in an anonymous or open fashion on the Internet.

5. The method of claim 1, wherein transferring said buyer's actual purchase information to a server on the Internet is by a retail seller or Internet seller transmitting actual purchase information of said buyer to an Internet server where the Internet server software places the information in a database for the purpose of displaying the information to the users through equipment including but not limited to the Internet, fax, cell phone, messaging device, or other means.

6. The method of claim 1, wherein displaying the actual purchase information is selected by the user as a preference which allows various ways of comparing and viewing the purchase information including but not limited to comparing actual purchase prices by seller purchased from, by date of purchase, or by seller's location of the purchase.

7. The method of claim 1, wherein transmitting the compiled purchase information to the user of the system is by messaging, email, or web display wherein the information may be various buyers' actual purchase price information comprising information about new low prices actually paid for a particular product by another buyer at a store in the same city, information about the prices of a particular product actually purchased from various stores in the same state, information of the total products purchased by the buyer within the prior year, and information of advertised prices for a particular product from various stores within a city compared to prices of the same product actually purchased by the buyers.

8. The method of claim 1, wherein said buyer's actual purchase prices are displayed in real time as the purchase information is delivered to the server on a geographical map which is visible to users on the Internet, wherein such map information may show for example individual locations of stores where the purchases are made, locations of purchases as the purchases are made by the buyers, or the locations of place where the purchase information is uploaded from by the buyers and sellers.

9. The method o! claim 1, wherein the purchase information delivered to the servers includes longitude and latitude of the buyer at the time of delivery of the purchase information, is delivered by a device that is capable of automatically uploading the location of the buyer including but not limited to mobile computers, cell phone devices, or other computing devices, and such longitude and latitude information is used to display the location of the buyer on a geographical map on the Internet along either with or without the display of the purchase information.

10. The method of claim 1, wherein the buyer is enabled to elect to show the buyer's purchase information to other users of the system anonymously or by a unique identifier and where the buyer may, by agreement, share such identifier information with other third party tools, web sites, and applications.

11. The method of claim 1, wherein the purchase information is uploaded to the server on the Internet along with uploading other information associated with the purchase information including product warranty information, product registration, or rebate information in paper or digital format for a product from the seller to a server connected to the Internet, wherein digital copy of the warranty card or rebate information is delivered in paper format or electronic format automatically to the seller or product distributor with all of the necessary information required by seller or product distributor for the warranty card, registration, or rebate information.

12. The method of claim 1, wherein the buyer is provided with a unique buyer email address account which the buyer may utilize with all possible sellers as the buyer's unique email account, wherein the buyer may utilize the unique buyer email account for all purchases resulting in the purchase information being sent directly from the seller to the server database, wherein the purchase information as delivered from such interaction is parsed by a server engine, and wherein the parsed information is delivered to all sellers which allows sellers to electronically deliver, filter and to populate an area of the database showing all special sales, coupons, and credits which the user may take advantage of from all stores.

13. The method of claim 1, wherein sellers deliver to said buyers electronically through the server a coupon or store credit in response to said buyer's delivering-purchase information from said buyer's location or a competing location.

14. The method of claim 1, wherein said buyer is provided with a client application for said buyer's mobile device, that with one click of the application automatically uses the camera contained in the device to take a photographic image of the purchase information, including said buyer's paper receipts, and then upload the image over the Internet through use of email, text messaging, SMS, ITP, or other means.

15. The method of claim 1, wherein the buyer's mobile device containing a client application using BLUETOOTH technology identifies other buyers of the purchase information system within a discrete location area reachable by the mobile device's BLUETOOTH technology's radio waves and provides a list of other nearby buyers using the purchase information system a) on the buyers' BLUETOOTH enabled mobile devices, b) by uploading the geographic location information from the buyer's BLUETOOTH enabled mobile device to a geographical map on a server on the Internet showing an anonymous list of all other buyers using the purchase information system with BLUETOOTH enabled devices located in a particular area near the user with BLUETOOTH enabled mobile device, or c) by delivering the list of nearby buyers with BLUETOOTH enabled mobile devices with geographic location information through the server electronically by web site, text message, or email to the sellers located within a predefined radius of the buyer's location.

16. The method of claim 1, wherein said buyer uploads purchase information created from an image of the paper purchase information document using a device, and the system delivers a store coupon or store credit immediately to said buyer's device based on said buyer's prior uploads of purchase information.

17. The method of claim 1, wherein the server enables a user to upload and download a list to or from said server over the Internet of desired purchases from or onto the user's device including but not limited to cell phone, mobile computing device, computer, smart device, palmtop or any plurality of equipment supporting data input or output display where the purchase information, including but not limited to actual prices paid by-buyers for various items purchased from sellers, contained in the Internet server is matched automatically by the server software to the desired purchase items identified by the user on the list and the results displayed on the user's device.

18. The method of claim 17, wherein said buyer uploads, using a mobile computing device or non-mobile computing device camera, the image or document of the purchase information document, including a paper receipt, attached to a subset of the list of items purchased and uploads the list in conjunction with said purchase information document to the system sever where the server processes the purchase information document and associates the individual items identified in the purchase information document to update the list of desired items as a means for the user to use for future purchases.

19. The method of claim 17, wherein the server uses software on said user's computing device or software on the server to upload over the Internet to said server and to attach and tag supporting documents associated with each item on the list of items desired to be purchase or actually purchased, wherein those supporting documents include warranty documents, mail-in-rebates, instruction manuals, and product registration forms.

20. A method of compiling, organizing and delivering special offers, coupons, credits, and product offers from sellers received by customers of sellers to a server-based system managing a database accessible over the Internet, said method comprising:

receiving at the server for each customer one or more special offers, coupons, credits, and product offers received by said customer from sellers wherein the server accepts:

said each customer's images of special offer, coupon, credit, and product offer documents received over the Internet directly from said each customer's mobile computing device or non-mobile computing device; and said each customer's special offers, coupon, credit, and product offer information from said seller to the server over the Internet;

storing the special offers, coupon, credit, and product offer information in the database and compiling the purchase information to facilitate comparisons; and displaying by the server to users in an anonymous or alternatively open fashion on the Internet comprising the special offers, coupon, credit, and product offer information in part or in the aggregate.

21. The method of claim 20, wherein the coupons and store credits images and information are stored on the server connected to the Internet in an organized fashion including but not limited to date, store, item, or location which are available for identification by the user, located on a web site, and available for downloading to a computer device connected to the Internet, whether a mobile device or a non-mobile device, for the purpose of using the coupons and store credits at a store by the user.

22. The method of claim 20, wherein the coupons and store credits images and information, that are stored on a server on the Internet are identified by the date that the coupon expires and wherein the server sends a message to the user electronically over the Internet to the user's computing device using a plurality of methods including email, text, web application, or device application to inform the user of the pending expiration date for the coupon or store credit.

23. The method of claim 20, wherein the coupons and store credits images and document information are stored on the server connected to the Internet and are able to be delivered to the user's mobile computing device by sending a text message or email from the user's device to the server with a unique identifying number or text as a means to identify and enable the user to download to the user's mobile or non-mobile computing device connected to the server over the Internet and to enable the user to apply the particular coupons or store credits to a particular purchase at a store by the user.

* * * * *